(12) United States Patent
Ishii et al.

(10) Patent No.: US 7,880,932 B2
(45) Date of Patent: Feb. 1, 2011

(54) HALFTONE DOT FORMATION METHOD AND APPARATUS FOR REDUCING LAYER THICKNESS OF COLORING MATERIAL INSIDE HALFTONE DOTS, AND IMAGE FORMATION APPARATUS

(75) Inventors: Akira Ishii, Kanagawa (JP); Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 366 days.

(21) Appl. No.: 11/357,950

(22) Filed: Feb. 22, 2006

(65) Prior Publication Data
US 2006/0290731 A1   Dec. 28, 2006

(30) Foreign Application Priority Data
Feb. 22, 2005 (JP) ............... P2005-045107
Feb. 9, 2006 (JP) ............... 2006-032016

(51) Int. Cl.
*G06K 15/00* (2006.01)
(52) U.S. Cl. ............... 358/3.06; 347/15; 358/1.8; 358/3.01; 358/3.11; 358/3.12; 358/3.17
(58) Field of Classification Search ............ 358/3.06
See application file for complete search history.

(56) References Cited

U.S. PATENT DOCUMENTS

| | | | | |
|---|---|---|---|---|
| 5,291,311 A | * | 3/1994 | Miller | 358/3.23 |
| 5,696,602 A | * | 12/1997 | Cooper et al. | 358/3.19 |
| 5,702,852 A | * | 12/1997 | May et al. | 430/47.4 |
| 5,808,755 A | * | 9/1998 | Delabastita | 358/3.17 |
| 5,828,463 A | | 10/1998 | Delabastita | |
| 5,884,013 A | * | 3/1999 | Bosschaerts et al. | 358/1.9 |
| 6,532,082 B1 | | 3/2003 | Dewitte | |
| 6,671,070 B1 | * | 12/2003 | Schildermans et al. | 358/1.9 |
| 2004/0160644 A1 | * | 8/2004 | Samworth | 358/3.09 |

(Continued)

FOREIGN PATENT DOCUMENTS

JP    A-62-216748    9/1987

(Continued)

OTHER PUBLICATIONS

U.S. Appl. No. 11/358,061, filed Feb. 22, 2003, Takebe et al.

(Continued)

*Primary Examiner*—King Y Poon
*Assistant Examiner*—David S Cammack
(74) *Attorney, Agent, or Firm*—Oliff & Berridge, PLC

(57) ABSTRACT

An image processing method generates a halftone-dot image by forming a halftone dot, which is represented by a set of one or plural output dots and corresponds to an intensity of an input image signal, while making a part of the dots constituting the halftone dot to be an actual non-output dot so as to reduce an amount of a coloring material of the halftone-dot portion. When the intensity of the image signal exceeds a predetermined value and is in a predetermined range, while maintaining contour dots, which are output dots contribute to formation of a contour of the halftone dot, to be the output dot, the image processing method makes a part of dots inside the contour dots to be the actual non-output dot.

8 Claims, 16 Drawing Sheets

U.S. PATENT DOCUMENTS

2004/0190029 A1* 9/2004 Rombola et al. ............. 358/1.9
2006/0256385 A1 11/2006 Takebe et al.

FOREIGN PATENT DOCUMENTS

| JP | A-03-053951 | 3/1991 |
|----|-------------|--------|
| JP | A-10-013685 | 1/1998 |
| JP | A-2004-128718 | 4/2004 |
| JP | A-2005-026987 | 1/2005 |
| WO | WO 00/72580 A1 | 11/2000 |

OTHER PUBLICATIONS

Japanese Patent Office, *Notification of Reason for Refusal for Japanese Patent Application No. 2006-032016* (with English translation), dated Mar. 19, 2010, p. 1 (pp. 1-2 for English translation).

* cited by examiner

FIG. 3
(A)
GAP-SIZE FIXED SYSTEM
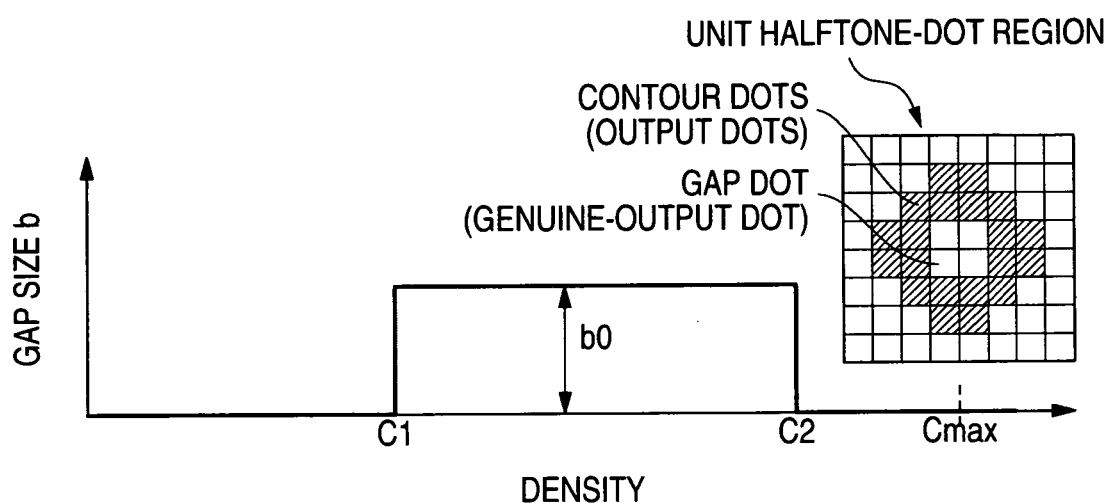
(B)
GAP-SIZE VARIABLE SYSTEM
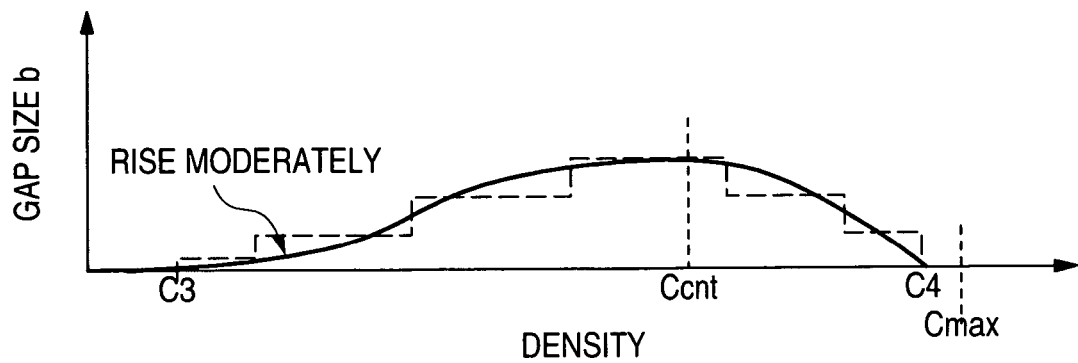

FIG. 4
(A)
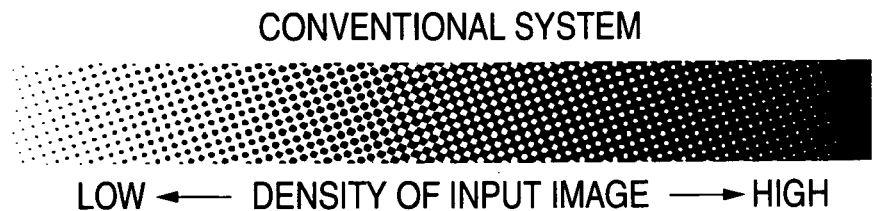
CONVENTIONAL SYSTEM
LOW ←— DENSITY OF INPUT IMAGE —→ HIGH
(B)
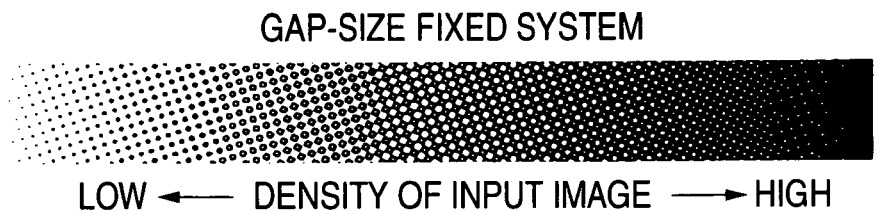
GAP-SIZE FIXED SYSTEM
LOW ←— DENSITY OF INPUT IMAGE —→ HIGH
(C)
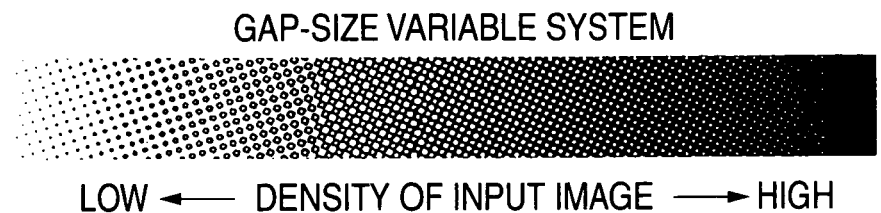
GAP-SIZE VARIABLE SYSTEM
LOW ←— DENSITY OF INPUT IMAGE —→ HIGH

FIG. 12
(A) OUTLINE OF CONVENTIONAL BINARIZATION PROCESSING
(HALFTONE PROCESSING)
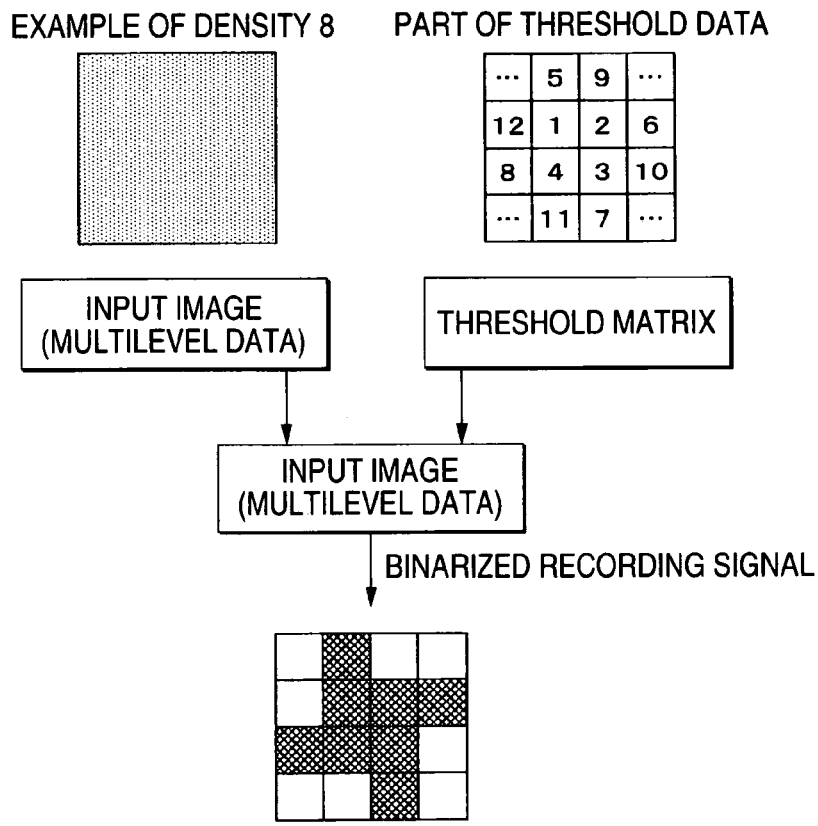
(B) EXAMPLE OF HALFTONE-DOT IMAGE:
CASE OF HALFTONE SCREEN OF 190 LINES/18 DEGREES
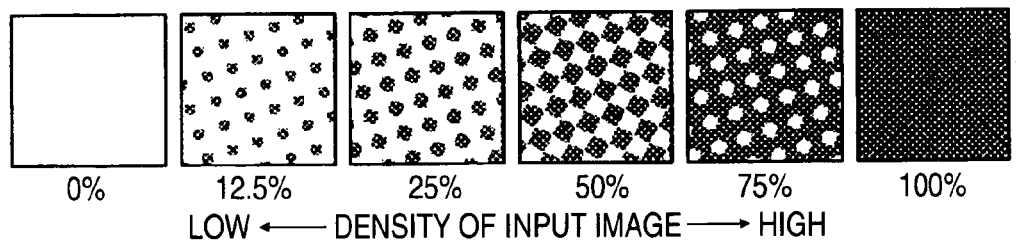
LOW ←— DENSITY OF INPUT IMAGE —→ HIGH

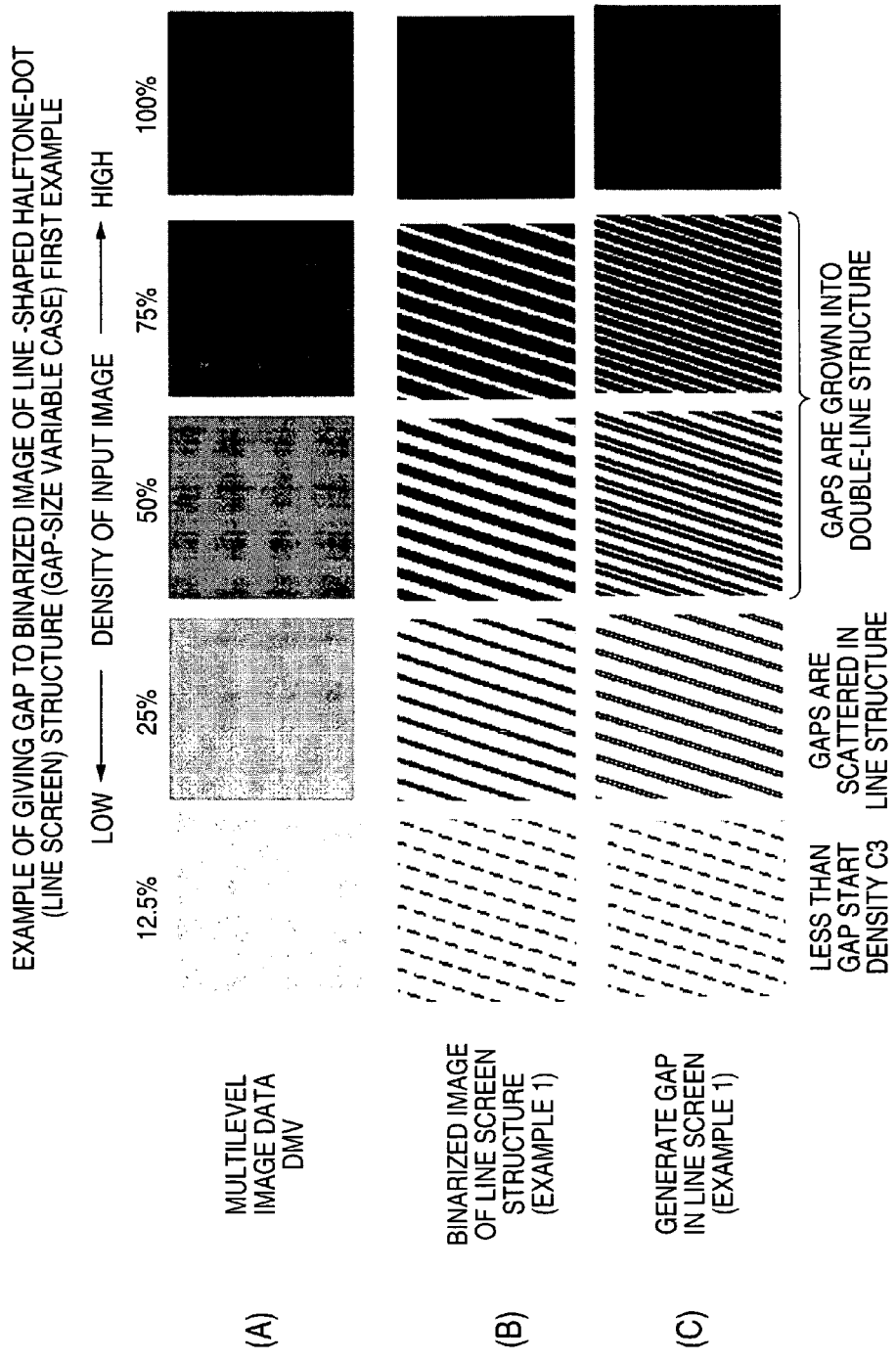

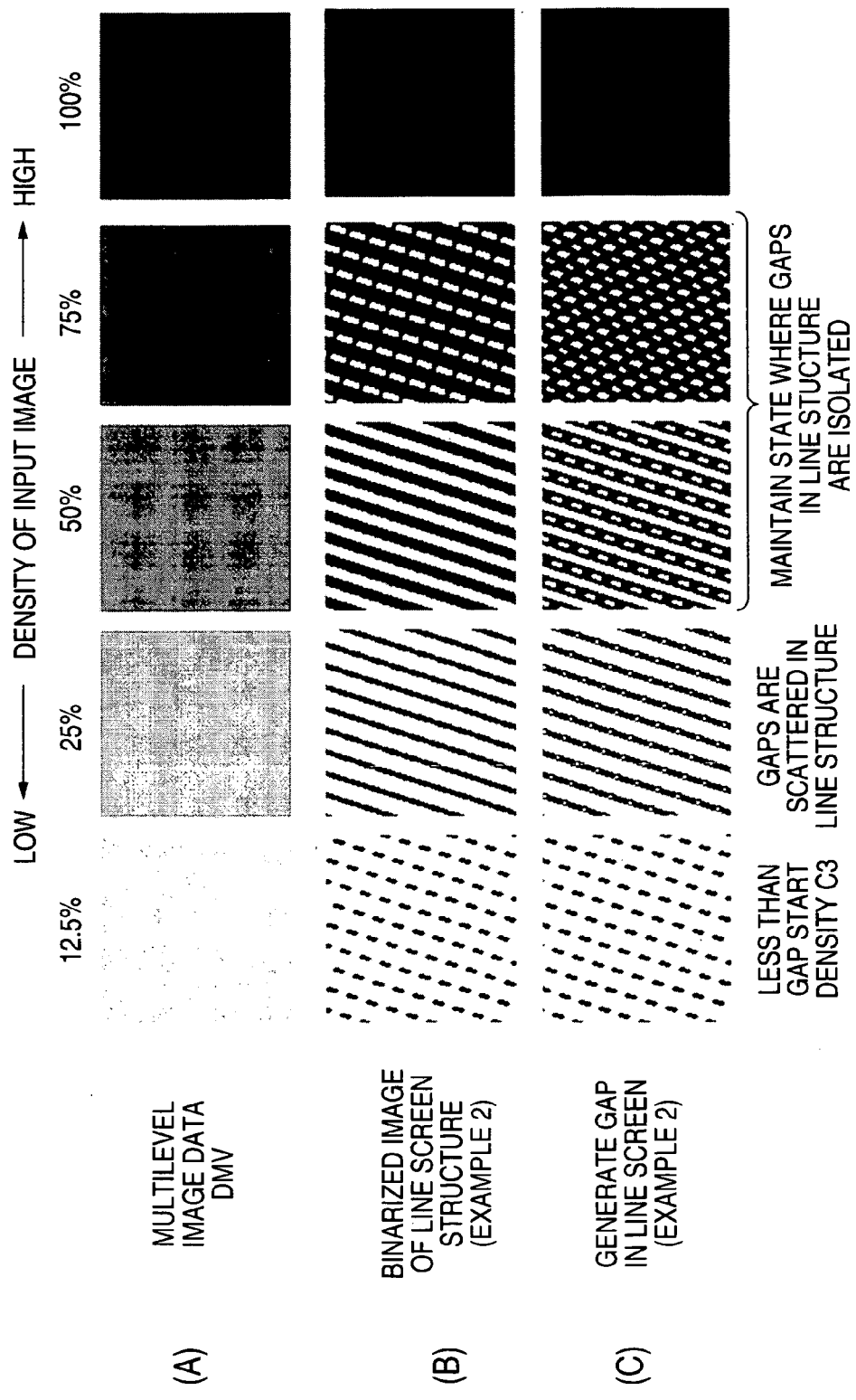

HALFTONE DOT FORMATION METHOD AND APPARATUS FOR REDUCING LAYER THICKNESS OF COLORING MATERIAL INSIDE HALFTONE DOTS, AND IMAGE FORMATION APPARATUS

The entire disclosures of Japanese Patent Application No. 2005-45107 filed on Feb. 22, 2005 and Japanese Patent Application No. 2006-32016 filed on Feb. 9, 2006, including the specifications, claims, drawings and abstracts are incorporated herein by reference in its entirety.

BACKGROUND OF THE INVENTION

1. Field of the Invention

The present invention relates to an image processing method, an image processing apparatus, and an image forming apparatus. More specifically, the invention relates to a binarization processing technique for generating a halftone-dot image by forming a halftone dot having a predetermined size corresponding to an intensity of an input image signal, the halftone dot which is used to record a halftone-dot image on an image recording medium in a printing technique such as an electrophotographic method and an inkjet method.

2. Description of the Related Art

As one of the techniques for generating a halftone-dot image using binary data, there has been known a binarization processing method (particularly referred to as a halftone processing method) in which colored dots called halftone dots (set of individual halftone output dots), each having a predetermined size corresponding to an intensity of an input image signal, are formed to thereby reproduce the density of a gradation image in a pseudo manner by the size of each colored dot.

For example, a color printed matter is obtained by printing respective inks, each having one of four colors composed of yellow (Y), magenta (M), cyan (C), and black (K) colors, on a recording medium (printing paper) with the inks superposed on one another subsequently, using four printing plates for the inks. On the printing plates are recorded halftone plate images in which gradation of continuous-tone images of a color manuscript is reproduced with a set of microscopic halftone dots.

FIG. 12 is a diagram illustrating an example (A) of the above-mentioned halftone processing and an example (B) of halftone dots generated by the halftone processing. For example, when generating a halftone plate image in a printing technique using an electrophotographic method, a comparator compares multilevel-image signals (multilevel data) representing the gradation of an image of a color document with predetermined screen pattern data (each threshold-value data in a threshold-value matrix) as shown in FIG. 12(A), to generate binarized recording signals.

Further, the halftone plate images are exposed on an image formation member (for example, a photoconductor drum) by controlling on/off of a light beam for exposure according to halftone dot signals, using the binarized recording signals as on/off signals (halftone dot signals) for each record pixel. Then, toner (powder) is sprayed onto the image formation member to visualize an image on the image formation member (a latent image) as a toner image. Thereafter, the toner image is transferred and fixed onto the image recording medium to form an image having halftone dots having a size corresponding to the density of the image as shown in FIG. 12(B).

Here, when the halftone dots are used in the electrophotographic method, in general, one or two grains (1.5 grains in average) of toner are piled up, reaching a height in a range of ten and several μm before a toner image is fixed. Since the height of the piled-up toner is in many cases determined by an amount of toner required for the maximum density of the image, it may be an excessive amount of toner for halftone reproduction. In particular, since the size of a halftone dot is small in a highlight tone area (low density region), there are high possibilities that this problem occurs.

For color reproduction, a thin halftone-dot toner image is needed in the transfer process of toner because deterioration of image quality during the transfer process increases as the thickness of a halftone-dot toner image is larger. In addition, for a multi-transfer for the color reproduction, more attention should be paid to the deterioration of image quality. However, it is difficult that the amount of toner needed for the maximum density is compatible with the amount of toner appropriate for the halftone dot reproduction.

Further, a non-fixed toner image having a thickness in the range of ten and several μm is crushed into a fixed toner image having a thickness of several μm after it is fixed. When the toner fixed on paper absorbs light, density reproduction by the toner occurs. In order to enhance the light absorption efficiency, it is required to efficiently expose a coloring material containing a thin toner layer to light. However, as described above, in the halftone-dot structure for the halftone reproduction, the toner layer may become excessively thick in many cases, and therefore, the toner which makes a low contribution to light absorption exists on the paper.

On the other hand, in a field of a printing technique, such as an inkjet method, using ink as a coloring material, there is a technique of controlling the amount of ink adhesion for forming halftone dots for the purpose of adjusting the thickness of the halftone dots called a dot gain or transferability of ink (coloring material).

[Patent Document 1] WO 00/72580
[Patent Document 2] U.S. Pat. No. 6,532,082

For example, for the purpose of reducing the dot gain of a stochastic screen (stochastic printing), mechanism disclosed in the patent document 1 is a technique for appropriately reducing the density of a binarized image by further stochastically thinning out an image binarized with the stochastic screen.

In addition, mechanism disclosed in the patent document 2 is a technique for appropriately reducing the density of a binarized image by stochastically thinning out the image binarized by a normal halftone process, premised on halftone dots of clustered dots.

More specifically, in the mechanism disclosed in the patent document 1, with respect to the stochastic screen called an FM screen; and in the mechanism disclosed in the patent document 2, with respect to a regular halftone screen called an AM screen, the dot gain and the amount of ink are adjusted by non-periodically thinning out some of the halftone dots. That is, halftone dots and gap dots area synchronously generated.

However, in the FM screen such as the mechanisms disclosed in the patent document 1, since the density of the image is reproduced with a minute density of dots, which are invisible (30 μm or less), some of the integrated (clustered) minute halftone dots may be thinned out and areas of colored pixels may be too small to reproduce dots stably.

On the other hand, in the AM screen such as the mechanism disclosed in the patent document 2, when some of the halftone dots are non-periodically thinned out, there may occur a case where some of the halftone dots are thinned out inside the halftone dots and a case where some of the halftone dots are thinned out outside the halftone dots. Accordingly, there may occur a phenomenon that the crush of some of the halftone dots is different from the crush of other halftone dots, which may result in image noises. In addition, a coloring material in a halftone dot portion may be made thin when many pixels are thinned out inside the halftone dots. However, when many pixels are thinned out outside the halftone dots, since the size reduction of the halftone dots is significant but an operation of thinning out the coloring material in the half tone dot portion is weakened, an effect of making the halftone dots uniformly thin can not be expected. In particular, since the size of the halftone dots becomes small in highlight tone area (low density area), there are high possibilities that the above-mentioned problems occur

SUMMARY OF THE INVENTION

The invention provides mechanism, which can thins a coloring-material layer in a halftone-dot portion while suppressing errors in densities of the output image and preventing image quality from deteriorating when density of a halftone-dot image is reproduced in a pseudo manner by using halftone dots, regardless of a printing method such as an electrophotographic method using powder as a coloring material or an inkjet method using ink as a coloring material.

An image processing method according to one embodiment of the invention for generating a halftone-dot image by forming a halftone dot, which is represented by a set of one or plural output dots and corresponds to an intensity of an input image signal, while making a part of the dots constituting the halftone dot to be an actual non-output dot so as to reduce an amount of a coloring material of the halftone-dot portion, the image processing method includes when the intensity of the image signal exceeds a predetermined value and is in a predetermined range, while maintaining contour dots, which are output dots contribute to formation of a contour of the halftone dot, to be the output dot, making a part of dots inside the contour dots to be the actual non-output dot.

An image processing apparatus according to another embodiment of the invention is suitable for implementing the image processing method according to the invention, and includes a binarization processing section that, when the intensity of the image signal exceeds a predetermined value and is in a predetermined range, while maintaining contour dots, which are output dots contribute to formation of a contour of the halftone dot, to be the output dot, makes apart of dots inside the contour dots to be the actual non-output dot.

An image forming apparatus according to a further another embodiment of the invention has a function of the image processing apparatus, which is suitable for implementing the image processing method according to the invention, and includes a binarization processing section that, when the intensity of the image signal exceeds a predetermined value and is in a predetermined range, while maintaining contour dots, which are output dots contribute to formation of a contour of the halftone dot, to be the output dot, makes a part of dots inside the contour dots to be the actual non-output dot, and an image recording section that forms the halftone-dot image including the actual non-output dot in the halftone dot, on a basis of the binarized data generated by the binarization processing section. For example, as a shape of an original halftone dot, which is a process target, there are a so-called dot-shaped halftone dot (so-called dot screen), that is, an output dot growing into a substantially circle shape in response to density, and a line-shaped halftone dot having a structure in which a halftone dot is continued in a line shape in a range where the input image signal has a density equal to or larger than a predetermined density (so-called line screen). The dot screen is easy in forming a halftone dot, but is easily affected by disturbance at the time of image formation and color moire. To the contrary, the line screen has an advantage that it is less affected by the disturbance at the time of the image formation and the color moire.

If the invention of this application is applied to the dot-shaped halftone dot, the dot-shaped halftone dot becomes a ring-shaped halftone dot. Also, in the case of applying the invention of this application to the line-shaped halftone dot, for example, non-output dots are made to be continued in a line shape in the line-shaped halftone dot in a predetermined density range. That is, two methods can be adopted representatively; one is the case where gap is grown in the line-shaped structure to form a double line structure and the other is the case where non-output dots are maintained to be isolated in the line-shaped halftone dot, that is, the non-output dots are not continued in a line shape in the line-shaped halftone dot. The latter is better in reproducibility of the line structure.

Also, a pure-electronic mechanism may be configured so that the part of dots inside the contour dots is made to be a real non-output dot on electronic data representing the halftone dot, that is that an image recording signal inside the halftone dot is thinned out. Alternatively, a mechanism may be configured to modulate recording energy of the non-output dot inside the contour dots of the halftone dot on a basis of the binarized data generated by the binarization processing section so as to reduce an amount of coloring material.

It is noted that a functional portion regarding the binarized data processing in the image processing apparatus and the image forming apparatus may be implemented by an electronic calculator (computer) in a software manner. Therefore, a program and a recording medium storing the program can be extracted as the invention. The program may be supplied with being stored in a computer readable storage medium or distributed by means of wired or wireless communication means.

According to the above configuration, only when the intensity of the image signal exceeds the predetermined value and is in the predetermined range, while the contour dots, which are the output dots contribute to the formation of the contour of the halftone dot, are maintained to be the output dot, the part of dots inside the contour dots is made to be the actual non-output dot. Therefore, a layer thickness of the coloring material inside the halftone dot can be reduced without the contour shape of the halftone dot made of the toner or ink being deformed.

Thereby, without deterioration of the image quality, the coloring material of the halftone-dot portion can be thinned effectively. Also, since a ratio of an amount of the coloring material contributing to light absorption is increased, the consumption amount of the coloring material can be reduced. Also, since the generation of the halftone dot and the generation of the gap are synthesized, control required for generating the gap dots inside the halftone dot is easy.

BRIEF DESCRIPTION OF THE DRAWINGS

FIG. 3 is a diagram showing an example of a gap size profile representing characteristics of threshold data for gap formation.

FIG. 4 is a diagram showing an example of an image (A) generated by a usual binarization process, and images (B) and (C) generated by using the gap size profile shown in FIG. 3 according to this embodiment.

FIG. 12 is a diagram illustrating a conventional and general halftone-dot process and a halftone-dot image.

FIG. 15 is a first example of generating gap with respect to the line-shaped halftone dot according to a halftone-dot process procedure of the third embodiment.

FIG. 16 is a second example of generating gap with respect to the line-shaped halftone dot according to a halftone-dot process procedure of the third embodiment.

DETAILED DESCRIPTION OF THE EMBODIMENTS OF THE INVENTION

Hereinafter, embodiments of the invention will be described in detail with reference to the accompanying drawings.

<Overall Configuration of Image Forming Apparatus; First Embodiment>

Figure 1:
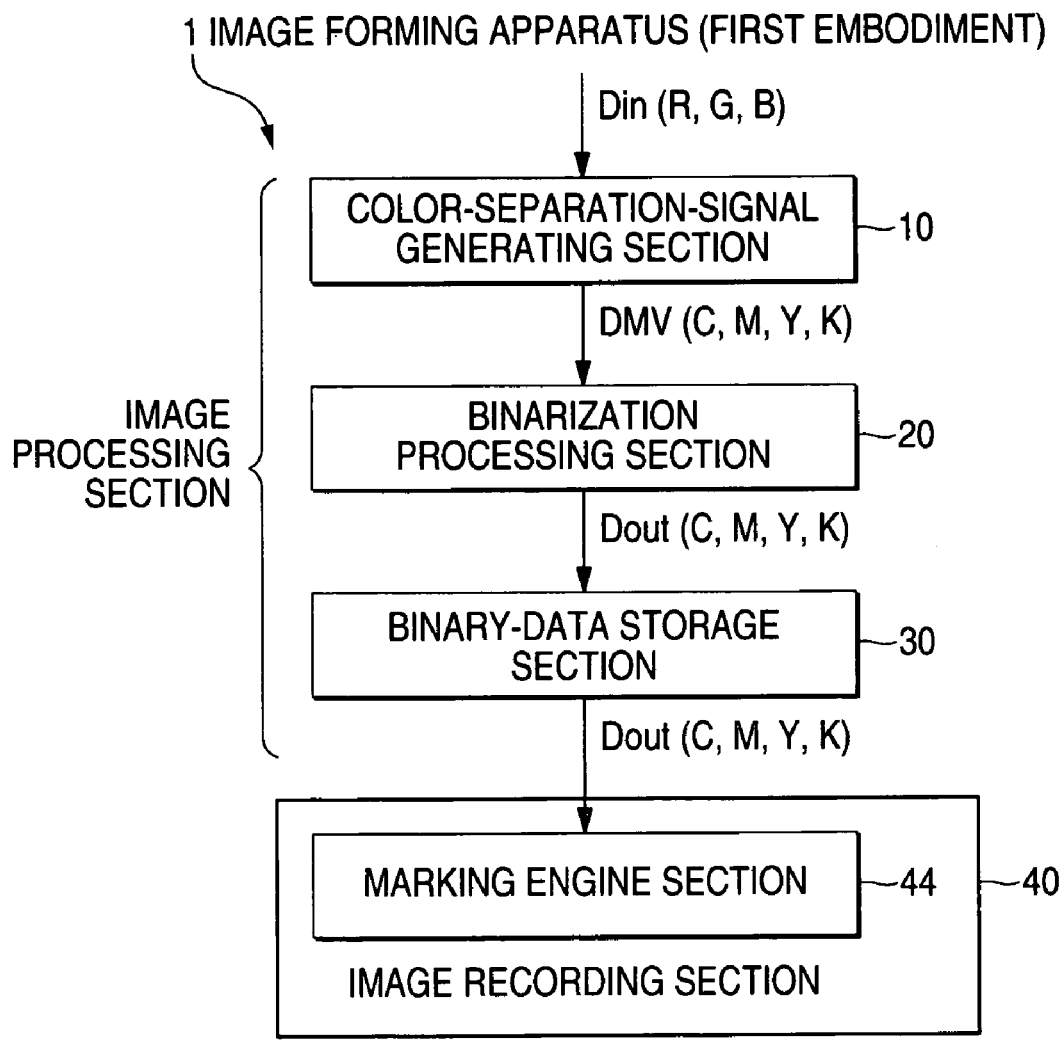
FIG. 1 is a diagram illustrating an overall outline of an image forming apparatus according to a first embodiment.

FIG. 1 is a diagram illustrating an overall outline of an image forming apparatus according to a first embodiment, with focusing attention on an image processing section (an image processing apparatus), which is involved in a binarization process, and an image recording section in a printing apparatus employing an electrophotographic method, an inkjet method or the like. As shown in the figure, an image forming apparatus 1 according to the first embodiment includes a color-separation-signal generating section 10, a binarization processing section 20, a binary-data storage section 30, an image recording section 40, and a profile switch commanding section 50. The color-separation-signal generating section 10, the binarization processing section 20, and the binary-data storage section 30 make up the image processing section (image processing apparatus), which is involved in the binarization process.

The color-separation-signal generating section 10 acquires image data Din having a relatively high number of bits (for example, 8 to 10 bits) for each of the color components of red (R), green (G), blue (B), for example, from an image input terminal such as a personal computer connected through an image reading unit or a communication interface (not shown) provided at a previous stage of the color-separation-signal generating section 10, and converts the acquired image data Din_R, Din_G, and Din_B for each of the color components into color separation data for each of the color components of C (cyan), M (magenta), Y (yellow), K (black) (hereinafter, referred to as multilevel image data DMV) corresponding to the toner colors, which are to be processed by the image recording section 40. For example, multilevel digital data R, G and B, each having several bits, is converted into multilevel digital data C, M, Y and K each having the same several bits. This color conversion process employs a process step of RGB data→Lab data→YMCK data.

In addition, in stages previous or next to the color-separation-signal generating process (a stage prior to the binarization processing), specific image processes (pre-processes) such as a background removal process, a magnification control process, a contrast adjustment (density adjustment) process, a color correction process, a filtering process, a TRC (Tone Reproduction Control) correction process (also referred to as gradation correction process) and the like are performed. These processes are well known in the related art, and therefore, explanation thereof will be omitted.

The binarization processing section 20 applies a screen process to the respective multilevel image data DMV_C, DMV_M, DMV_Y, and DMV_K for the respective input color components to generate binarized data (one bit data). For example, the binarization processing section 20 generates a binarized recording signal Dout, which represents the density of a gradation image in a pseudo manner by the size of the colored dots called halftone dots, from the multilevel digital data C, M, Y and K, which are multilevel image information having density gradation, and stores the generated binarized recording signal Dout in the binary-data storage section 30.

The image recording section 40 has a marking engine section 44 for reading out the binarized recording signal Dout generated by the binarization processing section 20 from the binary-data storage section 30 and then performing an image recording process. The marking engine section 44 may use various methods such as an electrophotographic method in which an electrostatic latent image is formed by exposure and then the latent image is developed, transferred and fixed by using toner as the coloring material, an inkjet method of using ink as the coloring material, or a plate printing method (for example, lithographic method) of transferring ink on the recording paper using a prepared printing plate.

<Configuration of Binarization Processing Section; First Embodiment>

Figure 2:
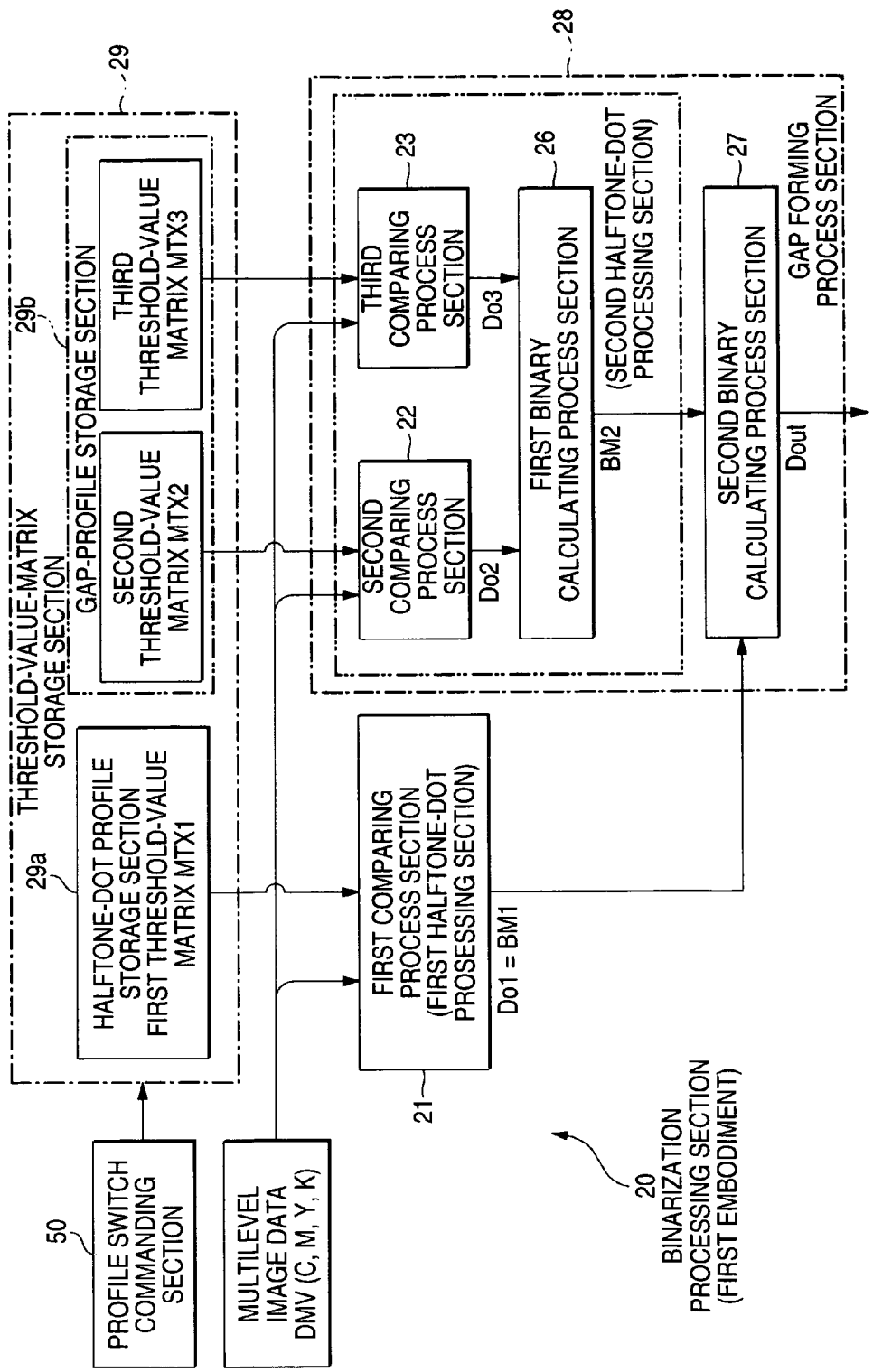
FIG. 2 is a diagram illustrating a configuration of a binarization processing section according to the first embodiment.

FIG. 2 is a diagram illustrating a configuration of the binarization processing section 20 (binarization processing section 20 of the first embodiment) used in the image forming apparatus 1 according to the first embodiment. In addition, FIGS. 3 and 4 are diagrams explaining basic characteristics of a gap formation process executed in the binarization processing section 20 according to the first embodiment.

Here, FIG. 3 is a diagram showing an example of a gap-size profile, which represents characteristics of threshold-value data for gap formation and is used in the gap formation process according to this embodiment. Further, FIG. 4(A) is a diagram showing an example of an image generated by a binarization process of a related art. FIG. 4 is a diagram showing an example of an image (A) generated by a usual binarization process, and images (B) and (C) generated by using the gap size profile shown in FIG. 3 according to this embodiment. Either figures show the case where the binarization processing section 20 processes a dot-shaped halftone dot whose output dot grows to have a substantially circle shape in accordance with the density.

In FIGS. 3(A) and 3(B), reference numerals C1 and C3 each denote a density giving a gap-formation starting point on a low-density side, and reference numerals C2 and C4 each denote a density giving a gap-formation starting point on a high-density side. In addition, in FIG. 3(B), reference numeral Ccnt denotes a density giving the maximum value of the number of gaps, that is, a density at which the number of gaps changes from increase to decrease. In particular, the reference numeral Ccnt is the first value at which all binarization data representing halftone dots output by the first comparing process section 21 has become output dots, when the intensity of the multilevel image data DMV (corresponding to the density of an input image) representing the input image is changed from the low-intensity side.

The setting of densities C1 and C3, which gives the gap-formation starting point on the low-density side, may be considered to be essential to arrange the white dots (non-output dots) inside the halftone dots while maintaining the outside of the halftone dots formed of a set of black dots (output dots) as the black dots (output dots). On the other hand, densities C2 and C4 giving the gap-formation starting point on the high-density side are set to arrange white dots (non-output dots) within the halftone dots only in an intermediate density region, but the densities C2 and C4 are not essential to the invention of this application. A density range in which white dots (non-output dots) are arranged inside the halftone dots may be in a range from the densities C1 and C3 giving the gap-formation starting point on the low-density side to the maximum density Cmax.

The binarization processing section 20 according to the first embodiment has features that it includes a plurality of sets of comparators for binarization and threshold-value matrixes, and that a plurality of calculation processors for performing a logic operation for binary data output from the comparators, as compared with conventional examples. In addition, the respective sets of the comparators for binarization and the threshold-value matrixes are modules, which can form the same halftone-dot structures, but are characterized by the values of the threshold-value matrixes.

Specifically, as shown in the figure, the binarization processing section 20 according to the first embodiment includes three comparing sections 21, 22 and 23 for performing a comparison process for binarization by referring to the multilevel data to be processed and the threshold-value matrix, two binary calculating process sections 26 and 27 for performing a logic operation for binary data output from the comparing sections 21, 22 and 23, and a threshold-value-matrix storage section 29.

The first comparing process section 21 corresponds to a first halftone-dot processing section. A second halftone-dot processing section includes the second and third comparing sections 22 and 23 and the first binary calculating process section 26. In addition, a gap forming process section 28 for forming gaps in the center portion of the halftone dots generated by the first comparing process section 21 while maintaining a contour of the halftone dots includes the second and third comparing sections 22 and 23 and the first and second binary calculating process sections 26 and 27.

Further, an algorithm for generating the halftone-dot image in the second halftone-dot processing section including the second and third comparing sections 22 and 23 and the first binary calculating process section 26 is basically similar to an algorithm for generating a halftone-dot image (black dots) as in the first comparing process section 21 (that is, the first halftone-dot processing section), even though threshold-value matrixes MTX1 referred to by these algorithms are different.

The threshold-value-matrix storage section 29 outputs threshold values corresponding to coordinate values within the matrixes. For example, the threshold-value-matrix storage section 29 has a halftone-dot profile storage section 29a and a gap-profile storage section 29b.

The halftone-dot profile storage section 29a stores profile data fundamental to forming the halftone dots. Specifically, the halftone-dot profile storage section 29a stores a first threshold-value matrix MTX1, which defines halftone-dot sizes corresponding to densities of the input image, that is, defines the densities of the input image for generating the halftone dots. The first threshold-value matrix MTX1 gives a halftone-size profile including a set of threshold-value data for formation of halftone dots used in the halftone-dot forming process. Although the first threshold-value matrix MTX1 is prepared so that a dot pattern similar to a conventional halftone-dot growth can be basically output, the first threshold-value matrix MTX1 is different from the conventional halftone-dot growth in that the number of output dots increases gradually within a unit halftone-dot region until the density of the input image reaches from "0" to a transition-point density Ccnt, and that all the dots within the unit halftone-dot region become output dots after the density of the input image exceeds the transition-point density Ccnt.

The gap-profile storage section 29b stores profile data, which defines gap sizes corresponding to the densities of an input image, that is, defines the densities of the input image for generating the gaps. Specifically, the gap-profile storage section 29b stores second and third threshold-value matrixes MTX2 and MTX3 giving gap-size profile including a set of threshold-value data for gap formation used in the gap forming process.

Here, the gap-size profile data (that is, threshold-value data) stored in the gap-profile storage section 29b makes the gap forming process section 28 to be able to generate halftone dots having gaps of a size according to the gap-size profile data.

For example, the second threshold-value matrix MTX2 mainly defines gap sizes on the low-density side in a middle density region of the multilevel image data DMV. The third threshold-value matrix MTX3 mainly defines gap sizes on the high-density side in the middle density region of the multilevel image data DMV. A combination of the both matrixes defines gap sizes in the entire middle density region of the multilevel image data DMV. "Combination of the both matrixes" in the first embodiment actually refers to a logic synthesis for a result of the comparison with reference to the threshold-value matrixes MTX2 and MTX3.

The gap-size profile has a basic characteristic that when an input density exceeds a predetermined density, some of halftone dots (black dots: output dots) are made to be white dots (non-output dots) to form gaps, to thereby reduce an amount of coloring material on the entire halftone dots. In other words, the gap-size profile has a characteristic that gaps are not formed within integrated (clustered) minute halftone dots by not forming the gaps until the density of the input image exceeds the predetermined density. Reproducibility of halftone dots deteriorates when gaps are generated in a highlight tone area where a dot size is small. This problem can be overcome by forming the gaps with setting a relatively high density as the gap-formation starting point.

In particular, as shown in the right upper portion of FIG. 3(A), within the unit halftone-dot region, while maintaining a contour of a halftone dot, that is, while maintaining the outmost output dots in lateral, longitudinal, and oblique directions (hereinafter, referred to as "outline dots"), which contribute to the formation of a contour of the halftone dots, as output dots, the gaps are formed by making some dots inside the outline dots be real non-output dots. That is, while maintaining coloring material of contour portion of the halftone dots to a predetermined amount, the amount of coloring material inside the contour portion of halftone dots can be appropriately reduced.

Further, in a case in which a plurality of non-output dots are formed inside the outline dots, if the non-output dots are isolated from one another inside the outline dots, pixels to be thinned out inside the halftone dots are scattered, which may reduce an effect of making the coloring material of the halftone dots thin. To avoid this problem, it is preferable to gather the plurality of non-output dots into a cluster such that the plurality of non-output dots are connected to one another, if at all possible, without isolating the plurality of non-output dots from one another. In addition, since output dots are scattered if output dots of the halftone dots exist in a cluster composed of the non-output dots, it is preferable to form the cluster with only the non-output dots. Also, from a point of view of maintaining contour, it is preferable to make the shape of a cluster composed of non-output dots resemble the shape of the outline of the halftone dots as much as possible.

For example, since halftone dots having sizes corresponding to the densities are formed by increasing output dots such that a set of black dots (output dots) has a roughly circular shape, it is preferable to circularly thin out the recording signals (output dots) inside the halftone dots having the roughly circular shape, that is, to increase the number of non-output dots gradually from the center of the halftone dots such that the set of non-output dots has a roughly circular shape. For example, when four non-output dots are formed inside the halftone dots, it is not preferable that four non-output dots are not arranged in line in the lateral, longitudinal, or inclined direction, but preferable that two non-output dots are arranged in the lateral direction and the other two non-output dots in the longitudinal direction. Internal output dots are converted (thinned out) into non-output dots such that the output dots are arranged in a roughly ring shape when viewing the entire "halftone dots having gaps" as a final result.

For example, the gap-profile storage section 29b stores profile data according to one or both of a gap-size fixed system shown in FIG. 3(A) and a gap-size variable system shown in FIG. 3(B). The value of the gap size b shown in FIG. 3(A) is an example, and a plurality of profiles having various values obtained by modifying the gap size b may be prepared. Similarly, a characteristic line shown in FIG. 3(B) is an example, and a plurality of profiles obtained by modifying the variation amount (including maximum value) of the characteristic line in various ways may be prepared. In any cases, a certain correspondence relationship should exist between the density of the input image and the gap size.

Further, when the plurality of profiles are stored, in actuality, one of the profiles is selected and used according to its application on the basis of a user's instruction through the profile switch commanding section 50. Halftone-dot images with gaps having different characteristics can be easily generated by changing the used profile.

Here, the gap-size fixed system refers to a system of forming a gap having a fixed size b0 at nearly a center inside the halftone dots in a specific range (C1 to C2) of the middle density region of density values of the multilevel image data DMV. On the other hand, the gap-size variable system refers to a system of dynamically (almost continuously) varying the gap size according to a density as shown by a solid line in FIG. 3(B), in a specific range (C3 to C4) of the middle density region of density values of the multilevel image data DMV such that the gap size increases gradually to the maximum value and decreases gradually after reaching the maximum value.

In the gap-size fixed system, since one kind of a gap size b0 may only be designated in the specific range (C1 to C2) of the middle density region, a profile is relatively simple. However, a pseudo outline may occur at a position where gap is generated even though its generation mechanism is not evident. As one solution to this problem, the gap-size variable system for designating different gap sizes for different densities is employed.

Moreover, if relatively large (but smaller than halftone dots) gaps are formed within relatively small halftone dots, that is, if there are too many pixels thinned out inside the halftone dots, the coloring material of halftone dot portions may become too thin. To avoid this problem, in connection with variation characteristics of the gap size from the densities C1 and C3 giving the gap-formation starting point on the low-density side to the transition-point density Ccnt, it is preferable to smoothly increase the gap size. It is needless to say that the gap-size fixed system is employed to give such a characteristic.

Further, in FIG. 3(B), the characteristic line (solid line) is shown as a smooth curve varying substantially continuously. However, when gaps are actually formed within the halftone dots, the solid line has a multi-step characteristic because any dot having a predetermined size in the threshold-value matrix is output or not output.

Furthermore, as shown by a dotted line in FIG. 3(B), as an intermediate system between the gap-size fixed system and the gap-size variable system, a system of varying the gap size with several steps according to a density such that the gap size increases gradually to the maximum value and decreases gradually after reaching the maximum value in the specific range of the middle density region of density values of the multilevel image data DMV can be employed.

Each of the comparing sections 21, 22, and 23, which is an example of a density/threshold-value comparing section, compares the multilevel image data DMV representing the density of an input image, that is, the density of an input multilevel image, with the threshold value of each of the threshold-value matrixes MTX1, MTX2 and MTX3 stored in the threshold-value-matrix storage section 29 to then output an binary image.

For example, the first comparing process section 21 compares the multilevel image data DMV to be processed with the first threshold-value matrix MTX1. The second comparing process section 22 compares the multilevel image data DMV to be processed with the second threshold-value matrix MTX2. The third comparing process section 23 compares the multilevel image data DMV to be processed with the third threshold-value matrix MTX3.

The first binary calculating process section 26 performs a predetermined logic operation (specifically, difference process) between second binary data Do2 output from the second comparing process section 22 and third binary data Do3 output from the third comparing process section 23.

The second binary calculating process section 27 performs a predetermined logic operation (specifically, difference process) between first bit map data BM1, which is the first binary data Do1 output from the first comparing process section 21, and second bitmap data BM2, which is a result of the logic operation output from the first binary calculating process section 26.

A result of the logic operation executed in the second binary calculating process section 27 is temporarily held as a binarized recording signal Dout in the binary-data storage section 30. Then, the marking engine section 44 of the image recording section 40 uses the binarized recording signal Dout in the image recording process. That is, the marking engine section 44 serves as a recording-energy control section for recording images on the basis of the binarized recording signal Dout, which is binarization data making some dots inside the outline dots generated by the second binary calculating process section 27 become actual non-output dots.

<Procedure of the Halftone-Dot Process; First Embodiment>

FIG. 5 and FIGS. 6(A) to 6(E) are diagrams illustrating the binarization process (specifically, halftone-dot process) executed in the binarization processing section 20 according to the first embodiment. Here, in the case where the binarization processing section 20 forms non-output dot with the dot-shaped halftone dot (dot screen) being a process target, the following description will be given by assuming that the gap-profile storage section 29b stores the gap-size profile data of the gap-size variable system shown in FIG. 3(B).

Figure 5:
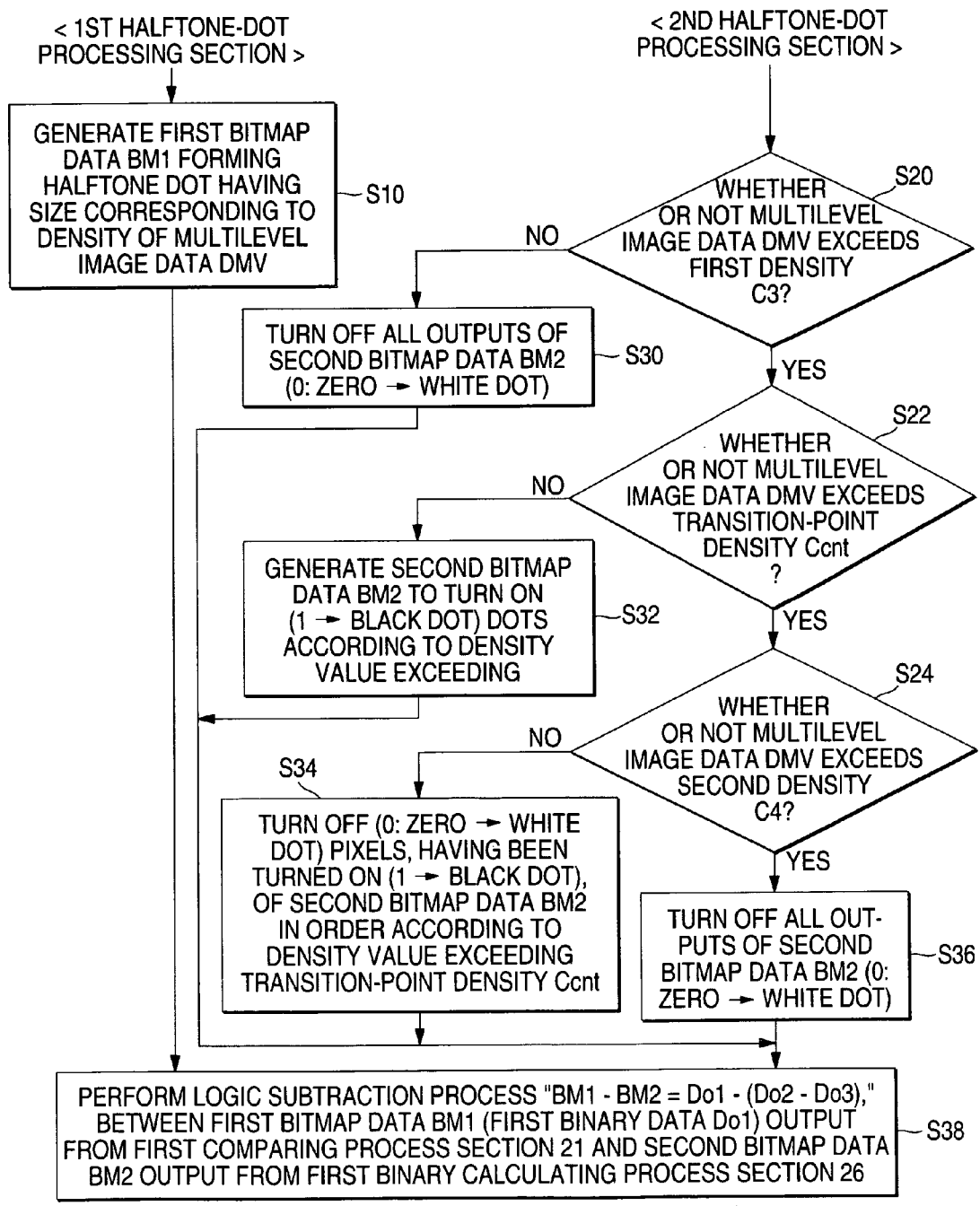
FIG. 5 is a flow chart illustrating an outline of a halftone-dot processing procedure by the binarization processing section of the first embodiment.
Figure 6:
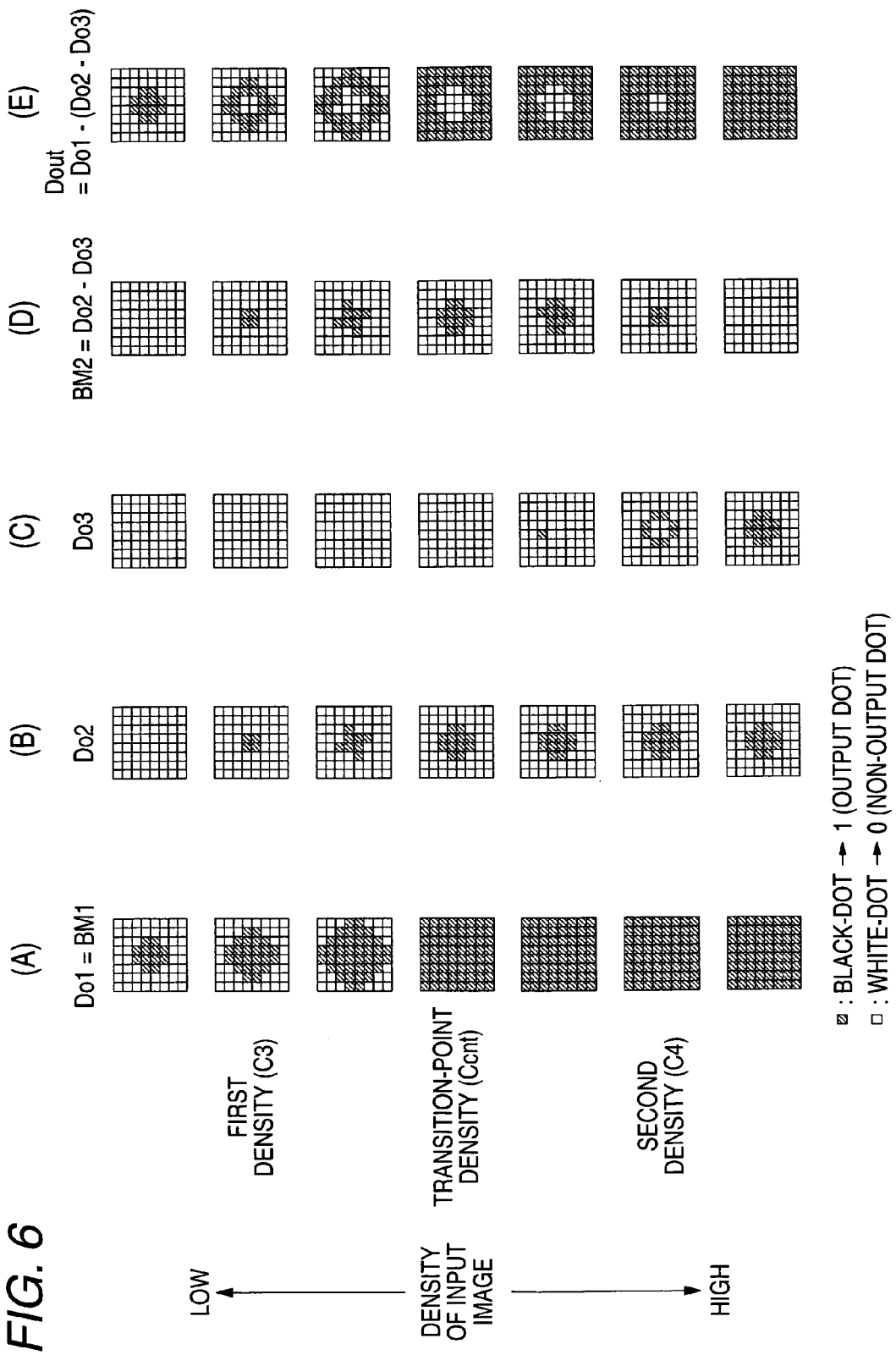
FIG. 6 is a diagram illustrating a procedure for generating ring-shaped halftone dots by the halftone dot process of the first embodiment.

FIG. 5 is a flowchart illustrating an outline of a process of the halftone-dot process by the binarization processing section 20 according to the first embodiment. FIGS. 6(A) to 6(E) are diagrams illustrating a process of generating ring-shaped halftone dots according to the halftone-dot process performed by the binarization processing section 20 of the first embodiment. For example, FIG. 6(A) shows an example of the first binary data Do1 output from the first comparing process section 21, that is, the first bitmap data BM1. FIG. 6(B) shows an example of the second binary data Do2 output from the second comparing process section 22. FIG. 6(C) shows an example of the third binary data Do3 output from the third comparing process section 23. FIG. 6(D) shows an example of the second bitmap data BM2 output from the first binary calculating process section 26. FIG. 6(E) shows an example of the binarized recording signal Dout output from the second binary calculating process section 27.

The binarization processing section 20 according to the first embodiment has a first feature that when multilevel image data DMV having a density gradation is reproduced in a pseudo manner by the size of colored dots called halftone dots, the amount of coloring material is reduced by forming gaps inside the halftone dots if density of an input image lies within the density range from the gap-formation starting point on the low-density side to that on the high-density side.

Further, the binarization processing section 20 according to the first embodiment has a second feature that it employs a method of thinning out information inside the halftone dots on the binarized recording signal Dout, that is, a method in which two images, i.e., a normal halftone-dot image and an image representing a gap are generated and then a logic synthesis for the two images is performed in order to reduce the amount of coloring material inside the halftone dots.

Furthermore, the binarization processing section 20 according to the first embodiment has a third feature that it generates the halftone dots having a halftone-dot size and a gap size according to the profile by referring to profile data in which the halftone-dot size and the gap size for each density are recorded, in order to reduce the amount of the coloring material by using, for example, a method of forming gaps in a central portion of dots in the density specified by generating two images.

The first comparing process section 21 sets the first threshold-value matrix MTX1 so as to output a halftone-dot pattern having a size in accordance with the density of the multilevel input image information (multilevel image data DMV) up to the transition density Ccnt as in the conventional halftone-dot growth, and compares with the multilevel image data DMV. Thereby, first bitmap data BM1 shown in FIG. 6(A) is generated (S10).

The second comparing process section 22 sets the second threshold-value matrix MTX2 so that dots of the second binary data Do2 grow in a pattern where a dot follows another dot of the first binary data Do1 from the inside of dots of the first binary data Do1 (=the first bitmap data BM1) toward the outside thereof where the density of the multilevel image data DMV is in a range of from a density C3 (first density) giving the gap-formation starting point on the low-density side to the transition-point density Ccnt and that the second binary data Do2 maintains the state of the transition-point density Ccnt, and compares with the multilevel image data DMV. Thereby, the second comparing process section 22 generates the second binary data Do2 shown in FIG. 6(B).

The third comparing process section 23 sets the third threshold-value matrix MTX3 so that dots are grown in a pattern where the inside of dots of the second binary data Do2 is filled with the dots from the outer side to the inner side of dots when the density of the multilevel image data DMV exceeds the density (the transition-point density) Ccnt, which gives the maximum value of the number of gaps, and compare the third threshold-value matrix MTX3 with the multilevel image data DMV. Thereby, the third comparing process section 23 generates the third binary data Do3.

The first binary calculating process section 26 generates the second bitmap data BM2 shown in FIG. 6(D) by performing a binary logic operation (logic subtraction process), which is "Do2−Do3", between the second binary data Do2 output from the second comparing process section 22 and the third binary data Do3 output from the third comparing process section 23.

A series of processes performed by the second halftone-dot processing section including the second comparing process section 22, the third comparing process section 23, and the first binary calculating process section 26 is to form gaps inside the halftone dots according to the gap-size variable system (in this embodiment) or the gap-size fixed system when the gaps are formed in the halftone dots with the input density lying within the middle density region C3 to C4, and are processes for making the gap size correspond to the density of the input image. The purpose of the processes is as follows.

For example, according to the gap-size variable system, when the density of the multilevel input image information (multilevel image data DMV) is less than the first density C3, the second bitmap data BM2 is generated in such a manner that all outputs of the second bitmap data BM2 are turned off (0; zero→white dot/non-output dot) (S20-NO, S30). When the density of the multilevel image data DMV is equal to or larger than the first density C3 and less than the transition-point density Ccnt, the second bitmap data BM 2 is generated so that dots are turned on (1→black dot/output dot) in accordance with the value of density exceeding the first density C3 (S20-YES, S22-NO, S32).

In addition, when the density of the multilevel input image information (multilevel image data DMV) is equal to or larger than the transition-point density Ccnt at which all signals of the first bitmap data BM1 are turned on (1→black dot/output dot) and less than the second density C4, on-pixels (1→black dot/output dot) in the second bitmap data BM2 are sequentially turned off (0; zero→white dot/non-output dot) according to the value of density exceeding the transition-point density Ccnt (S22-YES, S24-NO, S34). Further, when the density of the multilevel input image information (multilevel image data DMV) exceeds the second density C4, all outputs of the second bitmap data BM2 are turned off (0; zero→white dot/non-output dot) (S24-YES, S36).

Thus, in the second bitmap data BM2, which is an output result of the second halftone-dot processing section, as shown in FIG. 6(D), a halftone-dot image is generated so that black dots increase gradually in the specific range C3 to C4 of the middle density region of the density values of the multilevel image data DMV and decrease gradually after reaching the maximum value at the transition-point density Ccnt. That is, halftone dots corresponding to subsequent gaps (non-output dot) (a result of process in the second binary calculating process section 27) can be dynamically changed according to the density.

That is, in the second halftone-dot processing section including the second comparing process section 22, the third comparing process section 23, and the first binary calculating process section 26, the second bitmap data BM2 are generated as binarization data indicating non-output dots, which are represented by a set of output dots and dynamically corresponds to the intensities of the multilevel image data DMV (corresponding to the densities of the input image) in a range from the first density C3 to the second density C4.

In particular, in this example, while the gap-size variable system is employed, gaps are formed inside the halftone dots only in the middle density region. Therefore, the number of non-output dots takes its maximum value at the transition-point density Ccnt at which the first bitmap data BM1 all become "1," and the number of non-output dots gradually decreases from the maximum value before and after the transition-point density (from C3 to Ccnt and from Ccnt to C4). Thereby, the number of the non-output dots is made to dynamically correspond to the input image density.

Thereafter, the second binary calculating process section 27 generates the binarized recording signal Dout shown in FIG. 6(E) by performing a binary logic operation (logic subtraction process), which is "BM1−BM2=Do1−(Do2−Do3)", between the first bitmap data BM1 (the first binary data Do1) output from the first comparing process section 21 and the second bitmap data BM2 output from the first binary calculating process section 26 (S38).

As shown in FIG. 6(E), the binarized recording signal Dout output from the second binary calculating process section 27 is binary data having a gap inside the halftone dot in the middle density region. In other word, the binarization processing section 20 makes a part of dots inside the contour dots to be non-output dots, on the binarized recording signal Dout, which is electronic data representing the halftone dot.

Further, in this embodiment, since the gap-size variable system is employed, it is possible to obtain the profile shown in FIG. 3(B) in which the gap size varies according to the density so that the gap size becomes a maximum at substantial center of the middle density region and gradually decreases in the density region before and after the substantial center.

Furthermore, even though not shown, according to the gap-size fixed system, the second bitmap data BM2 is generated in such a manner that all outputs of the second bitmap data BM2 are turned off (0; zero→white dot/non-output dot) when the density of multilevel input image information (multilevel image data DMV) is less than the first density C1 and dots the number of which corresponds to the gap size b are turned on (1→black dot) when the density of the multilevel input image information (multilevel image data DMV) is equal to or larger than the first density C1 and less than the second density C2, without the determination process on the transition-point density and processes on the basis of the determination result in the gap-size variable system. In addition, when the density of the multilevel input image information (multilevel image data DMV) exceeds the second density C2, all outputs of the second bitmap data BM2 are turned off (0; zero→white dot).

According to the halftone-dot processing procedure executed by the binarization processing section 20 according to the first embodiment, it is possible to reliably generate the binarized recording signal Dout having a gap inside the halftone dot without damaging the contour shape of the halftone dots. Also, it is possible to remove the coloring material inside the halftone dots or to reduce the layer thickness in an output image by means of gaps inside the halftone dot in data. Thus, a high transferability of the coloring material and an improved image quality can be obtained. Also, since a ratio of the amount of coloring material contributing to light absorption can increase, it is possible to reduce the amount of coloring material consumption.

That is, since gaps are reliably formed inside the halftone dots without damaging the contour shape of the halftone dots, it is possible to make the coloring material layer of the halftone dots thin while preventing deterioration of image quality. For example, since dots are not thinned out at ends of the halftone dots, there is no possibility that the shapes of the halftone dots to be reproduced are changed. Accordingly, image noises due to the gaps are not generated.

Further, when the coloring material of the halftone dots is made to be thin by adjusting the number of pixels to be thinned out inside the halftone dots, that is, by adjusting the number of gaps inside the halftone dots, the contour shape of the halftone dots is not damaged, that is, gaps are not formed at the ends of the halftone dots. Therefore, there is no adverse effect in which the size of halftone dots is reduced. Accordingly, it is possible to make the halftone dots uniformly thin.

Furthermore, when the density of the input image signal exceeds the first density, the amount of coloring material is reduced inside the halftone dots. Therefore, dot inside the integrated (clustered) minute halftone dot is not thinned out as shown in the uppermost figure in FIG. 6(E). As a result, there is no possibility that dot reproduction in the halftone dot portion will become unstable due to excessive reduction of the coloring pixel area. That is, the amount of toner consumption can be reduced while maintaining the reproducibility of the highlight tone area. In particular, when the gap-size variable system for optimization of the gap size for each density is employed, it is possible to effectively improve the maintenance of image quality and to effectively reduce the amount of toner consumption while suppressing a pseudo outline at a position where gaps are generated.

In addition, at first two images are generated, i.e., a normal halftone-dot image and an image representing a gap are generated. Then, a logic synthesis for the two images is executed so as to form gaps inside the halftone dots. Thereby, the amount of coloring material inside the halftone dots can be reduced. Therefore, there is an advantage in that the gaps can be formed relatively simply inside the halftone dots by using a digital signal processing.

Moreover, the profile data (i.e., threshold-value data) defining the gap sizes corresponding to the densities of the input image is stored in the gap-profile storage section 29b, and the gaps are formed by comparing the threshold-value data with the multilevel image data DMV. Therefore, only by changing the profile, a single processing device can generates a halftone-dot image with gaps having different characteristics. Accordingly, even when the gap size or the density at which the gaps are generated changes, there is no need to re-design parameters for the binarization processing. As a result, parameters for gap generation can be efficiently designed.

<Example of Output of Halftone Dots According to the First Embodiment>

Figure 7:
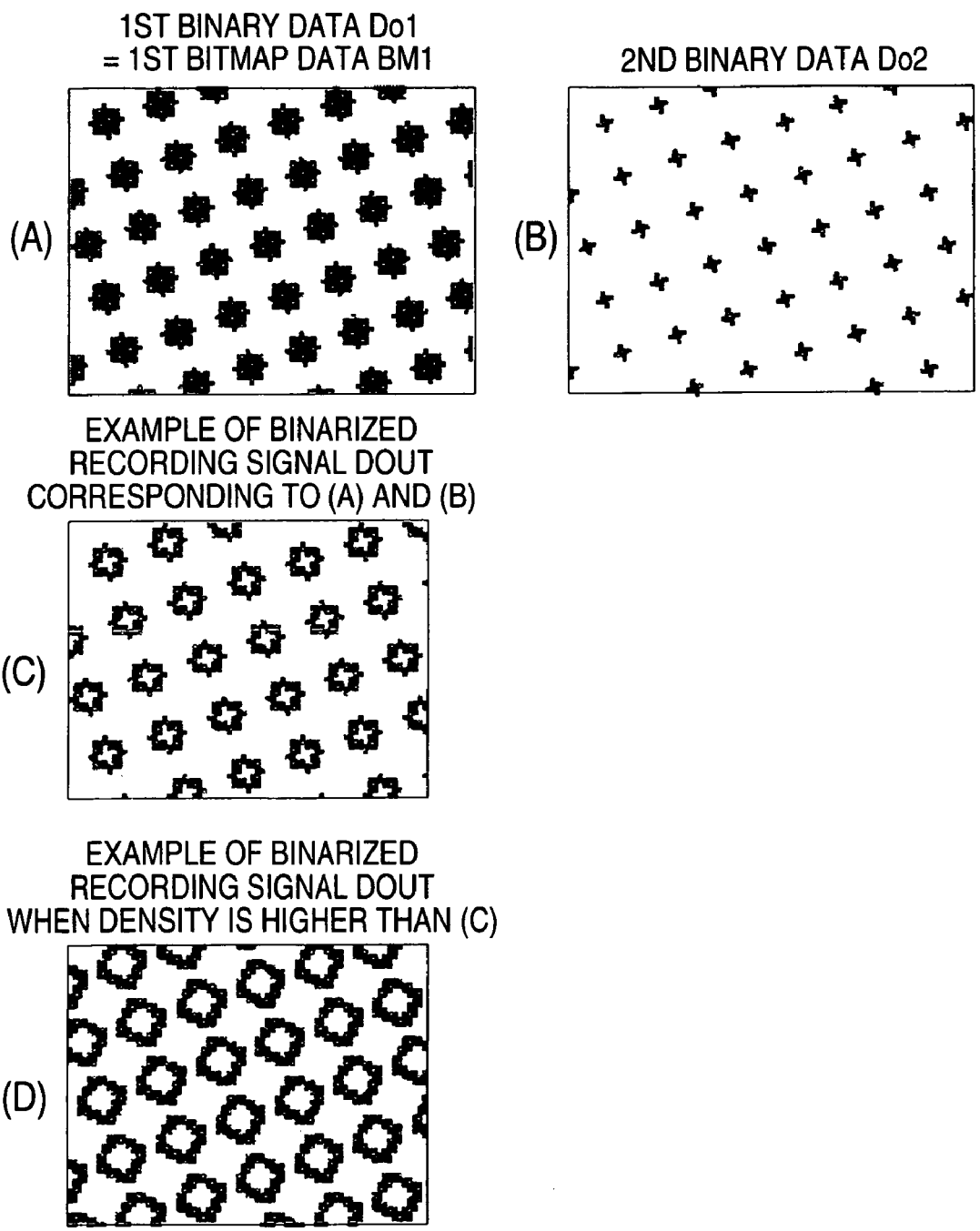
FIG. 7 is a diagram showing an example of an output of halftone dots when an image recording process is performed according to the halftone-dot processing procedure performed by the binarization processing section of the first embodiment.

FIG. 7 are diagrams showing an example of output of halftone dots when an image recording process is performed according to the procedure of the halftone-dot process executed by the binarization processing section 20 of the first embodiment. Those examples show design examples of ring-shaped halftone dots having a 190 lines/18 degree structure. FIG. 7(A) shows an output example of the first bitmap data BM1 (the first binary data Do1) output from the first comparing process section 21. FIG. 7(B) shows an output example of the second binary data Do2 output from the second comparing process section 22. FIG. 7(C) shows an output example of the binarized recording signal Dout output from the second binary calculating process section 27 with respect to the multilevel image data DMV corresponding to FIGS. 7(A) and 7(B). FIG. 7(D) shows an output example of the binarized recording signal Dout when the multilevel image data takes further higher density.

Figure 8:
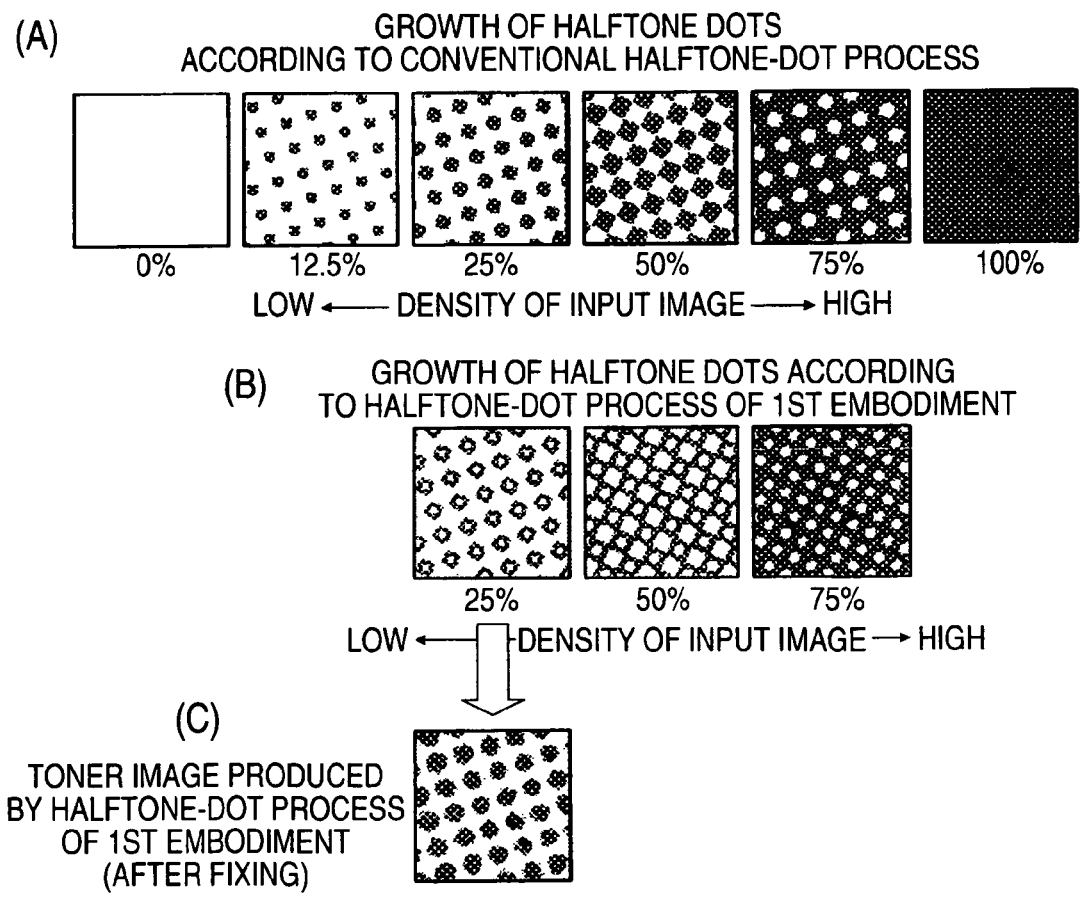
FIG. 8 is a diagram showing a comparison in an electronic image between halftone dots according a conventional method and the halftone dots generated in the process procedure according to the first embodiment

FIGS. 8(A) to 8(C) are diagrams showing a comparison in an electronic image between halftone dots according to a related-art method and the halftone dots generated according to the process procedure executed by the binarization processing section 20 of the first embodiment. This example also shows a design example of ring-shaped halftone dots having a 190 line/18 degree structure. Here, FIG. 8(A) shows a state of halftone-dot growth by a related-art technique. FIG. 8(B) shows a state of halftone-dot growth by the binarization processing section 20 according to the first embodiment. FIG. 8(C) shows a state after fixing the toner image to which the image recording section 40 applies the image recording process on the basis of the binarized recording signal Dout, which is generated from the input image of 25% density by the binarization processing section 20 according to the first embodiment.

As can be seen from a comparison of FIG. 8(B) with FIG. 8(C), when the binarization processing section 20 according to the first embodiment performs the halftone-dot process, by performing the binary calculation process to reduce the layer thickness of the coloring material inside the halftone dots without damaging the contour shape of the halftone dots due to toner or ink, it is possible to obtain a halftone-dot image the inside of which is filled up in an actual toner image even though ring-shaped halftone dots having gaps there inside are formed in an electronic image, that is, in the binarized recording signal Dout. This means that it is possible to reduce the amount of toner of the halftone-dot image by applying the halftone-dot process according to the first embodiment.

<Overall Configuration of Image Forming Apparatus; Second Embodiment>

Figure 9:
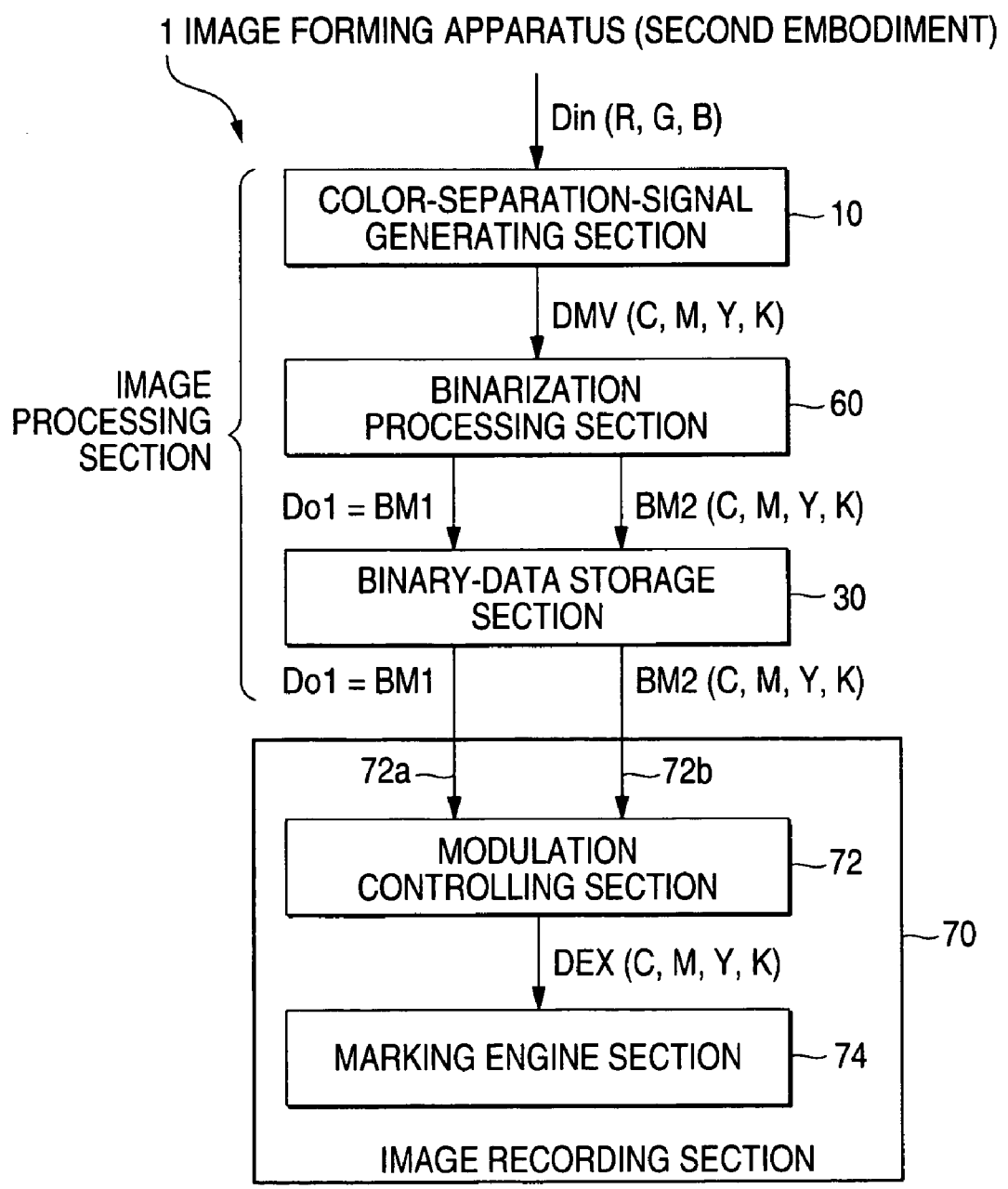
FIG. 9 is a diagram illustrating a configuration of a binarization processing section according to a second embodiment.

FIG. 9 is a diagram illustrating an overall outline of an image forming apparatus according to a second embodiment, with focusing attention on the binarization process in a printing apparatus employing an electrophotographic method, an inkjet method or the like. The second embodiment provides a method of reducing the amount of coloring material inside the halftone dots. The second embodiment is characterized by employing a method of modulating recording energy of non-output dots inside an outline halftone dot on the basis of the first bitmap data BM1 and the second bitmap data BM2 generated by the binarization processing section 20, in order to reduce the amount of the coloring material.

In the first embodiment, a completely electronic process is performed to make some dots inside the outline dots become non-output dots in the binarized recording signal Dout, which is electronic data representing the halftone dots. To the contrary, in the second embodiment, the control of the recording energy in the image recording section 70 is additionally performed.

Specifically, as shown in FIG. 9, an image forming apparatus 1 according to the second embodiment includes a color-separation-signal generating section 10, a binarization processing section 60, a binary-data storage section 30, and an image recording section 70.

Even though not shown, the binarization processing section 60 of the second embodiment has a configuration in which the second binary calculating process section 27 in the binarization processing section 20 of the first embodiment is removed.

The image recording section 70 has a modulation controlling section 72 for generating output modulation data DEX for recording and a marking engine 74 for performing an image recording process on the basis of the output modulation data DEX generated by the modulation controlling section 72.

The binarization processing section 60 provides the first bitmap data BM1 (the first binary data Do1) output from the first comparing process section 21 to an on/off control input terminal 72a of the modulation controlling section 72 through the binary-data storage section 30. Also, the binarization processing section 60 provides the second bitmap data BM2 output from the first binary calculating process section 26 to a modulation control terminal 72b of the modulation controlling section 72 through the binary-data storage section 30.

The modulation controlling section 72 generates the output modulation data DEX by using the first bitmap data BM1 as an on/off control signal for exposure and using the second bitmap data BM2 as output modulation control data.

In the image recording section 70 as configured above, the marking engine 74 controls the recording energy of the halftone dots on the basis of the output modulation data DEX so that the coloring material inside the halftone dots is reduced. That is, the marking engine 74 serves as a recording-energy control section for recording an image on the basis of the output modulation data DEX generated by the modulation controlling section 72.

For example, in the case where the marking engine 74 employs an electrophotographic process, the marking engine 74 controls exposure energy with using the output modulation data DEX as the exposure modulation data so that the coloring material inside the halftone dots is reduced. In addition, in the case where the marking engine 74 employs an inkjet method, the marking engine 74 controls the amount of ink with using the output modulation data DEX as ink amount modulation data so that the coloring material inside the halftone dots is reduced.

<Procedure of the Halftone-Dot Process; Second Embodiment>

FIG. 10 and FIGS. 11(A) to 11(D) are diagrams illustrating a binarization process (specifically, halftone-dot process) in the image forming apparatus according to the second embodiment. Here, it is assumed that the marking engine 74 employs the electrophotographic method.

Figure 10:
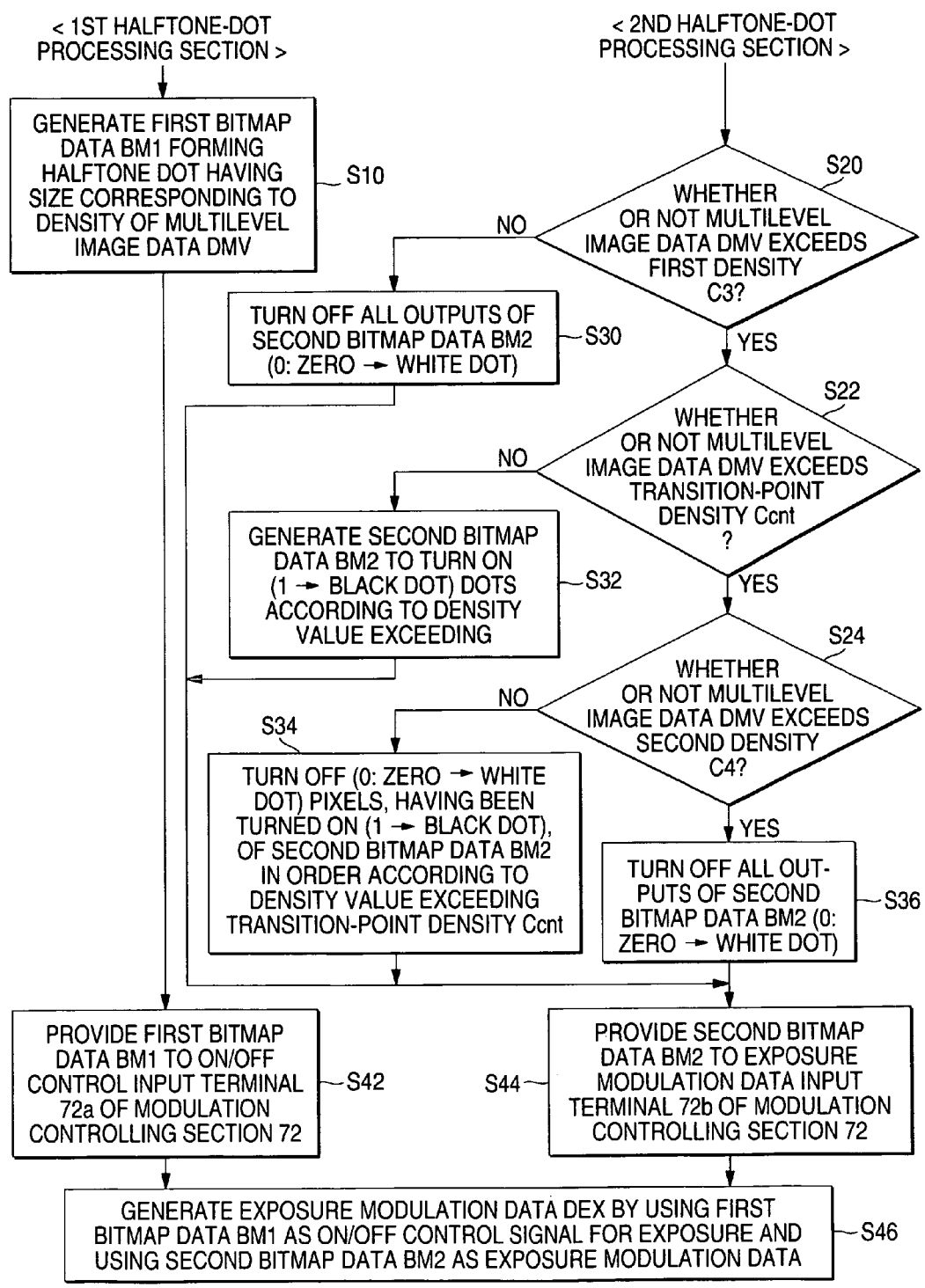
FIG. 10 is a flow chart illustrating an outline of a halftone-dot processing procedure used in an image forming apparatus according to the second embodiment.

FIG. 10 is a flow chart illustrating an outline of a procedure of the halftone-dot process executed by the image forming apparatus 1 according to the second embodiment. FIGS.

Figure 11:
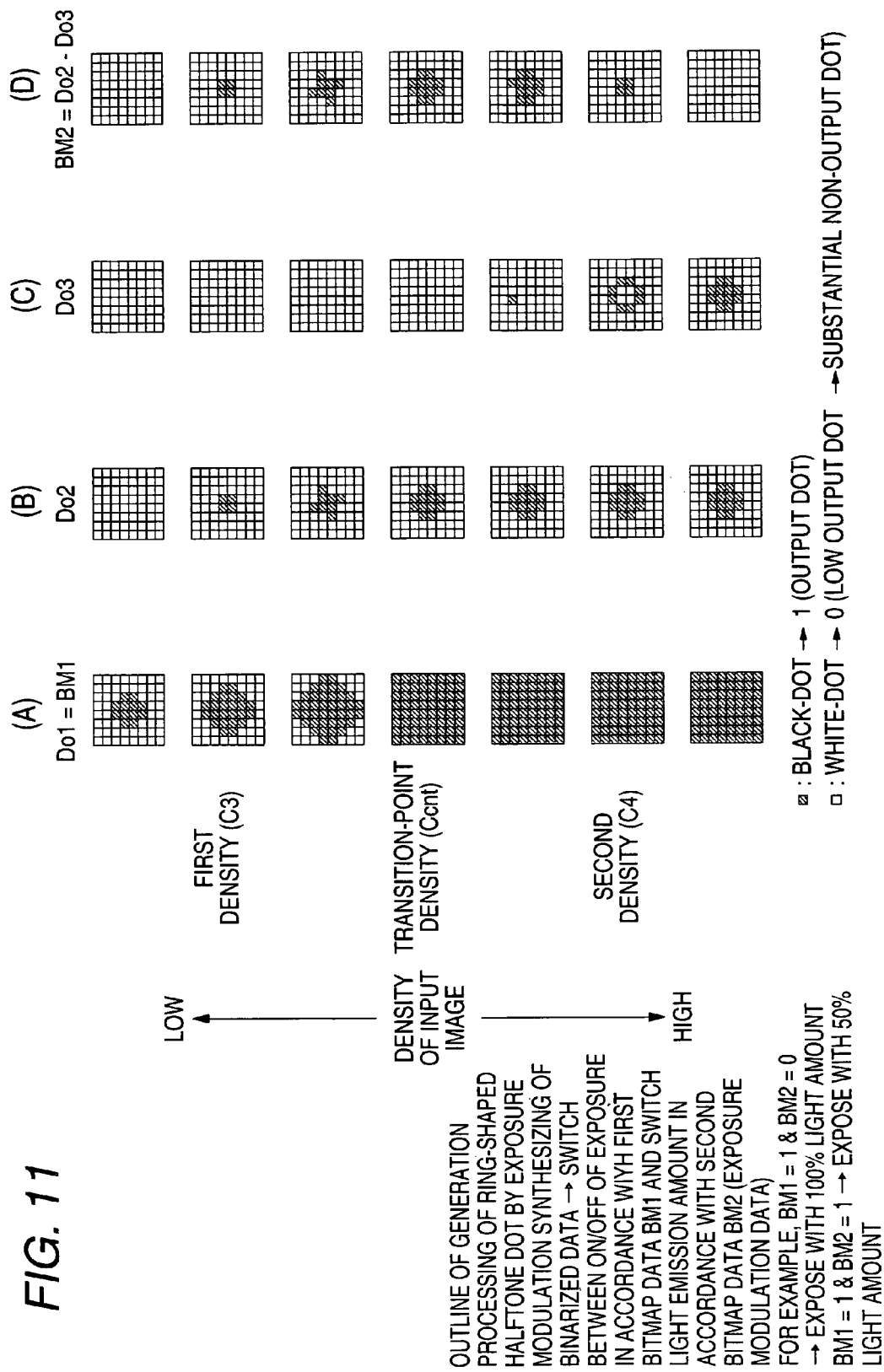
FIG. 11 is a diagram illustrating a process of generating ring-shaped halftone dots according to the halftone-dot process of the second embodiment.

11(A) to 11(D) are diagrams illustrating steps for generating ring-shaped halftone dots according to the halftone-dot process executed by the image forming apparatus 1 of the second embodiment. For example, FIG. 11(A) shows an example of the first binary data Do1 output from the first comparing process section 21, that is, the first bitmap data BM1. FIG. 11(B) shows an example of the second binary data Do2 output from the second comparing process section 22. FIG. 11(C) shows an example of the third binary data Do3 output from the third comparing process section 23. FIG. 11(D) shows an example of the second bitmap data BM2 output from the first binary calculating process section 26. FIGS. 11(A) to 11(D) are similar to FIGS. 6(A) to 6(D), respectively.

The first comparing process section 21 serving as a first halftone-dot processing section generates the first bitmap data BM1, which forms halftone dots having a size corresponding to the density of multilevel input image information (multilevel image data DMV) (S10), similar to the first embodiment. The first comparing process section 21 provides the generated first bitmap data BM1 to the on/off control input terminal 72a of the modulation-controlling section 72 (S42).

Further, in the second halftone-dot processing section including the second comparing process section 22, the third comparing process section 23, and the first binary calculating process section 26, the second bitmap data BM2, which forms halftone dots corresponding to gaps having a size corresponding to the density of the multilevel input image information (the multilevel image data DMV), is generated (S20 to S36) according to the same procedure as in the first embodiment. The second halftone-dot processing section provides the generated second bitmap data BM2 to the modulation control terminal 72b of the modulation controlling section 72 (S44).

The modulation controlling section 72 generates the output modulation data DEX with using the first bitmap data BM1 as the on/off control signal for exposure and using the second bitmap data BM2 as the output modulation control data (S46).

Here, in the configuration of the second embodiment, when the image recording section 70 forms a toner image on a portion exposed by light, the image recording section 70 performs an exposure if the first bitmap data BM1 (on/off control signal) is turned on (a hatched dot portion in FIG. 11(A)).

At this time, the image recording section 70 performs a 100% exposure when the second bitmap data BM2 (output modulation data) is "0; zero (a while dot portion in FIG. 11(D))", and performs an exposure with a small amount of light (for example, less than 50%) when the second bitmap data BM2 (output modulation data) is "1 (a hatched dot portion in FIG. 11(D))".

Thus, it is possible to make dots having the second bitmap data (output modulation data) of "1" become substantial non-output dots. In addition, the real non-output dots in the first embodiment and the substantial non-output dots are collectively called substantial non-output dots.

The second bitmap data BM2 (output modulation data) is obtained by the same process as in the first embodiment. If an exposure is performed on the second bitmap data BM2 when only the first bitmap data BM1 (on/off control signal) is turned on, it is possible to obtain a printed pattern having gaps inside the halftone dots in the middle density region, as shown in FIG. 6(E).

Thus, in actuality, it is possible to obtain the same halftone-dot output image as in the first embodiment. Moreover, in the output image, it is possible to remove the coloring material inside the halftone dots or to reduce the layer thickness by reducing the amount of exposure inside the halftone-dot image. Accordingly, a high transferability of the coloring material and an improved image quality can be obtained. Also, since a ratio of the amount of coloring material contributing to light absorption can increase, it is possible to reduce the amount of coloring material consumption.

Further, the first embodiment has an advantage in that the gaps can be formed relatively simply inside the halftone dots by using a digital signal processing because the gaps are formed inside the halftone dots by generating two images, i.e., the normal halftone-dot image and the image representing gaps, and then performing the logic synthesis for the two images. However, in the first embodiment, since the density of gaps in the electronic data (binarized recording signal Dout) becomes "0; zero", it is essentially impossible to freely adjust the density of gaps. Accordingly, in order to adjust the degree of thinness of the coloring material inside the halftone dots, there may arise a need to adjust the number of pixels to be thinned out inside the halftone dots.

On the contrary, in the second embodiment, since it is possible to adjust the amount of exposure when the second bitmap data BM2 (output modulation data) becomes "1 (a hatched dot portion in FIG. 11(D))", there is an advantage in that the density of gaps can be freely adjusted even though the modulation controlling section 72 is needed. Also, it is possible to adjust the degree of thinness of the coloring material inside the halftone dots while the number of pixels thinned out inside the halftone dots remains unchanged.

<Halftone-Dot Processing Procedure; Third Embodiment; Basic>

Figure 13:
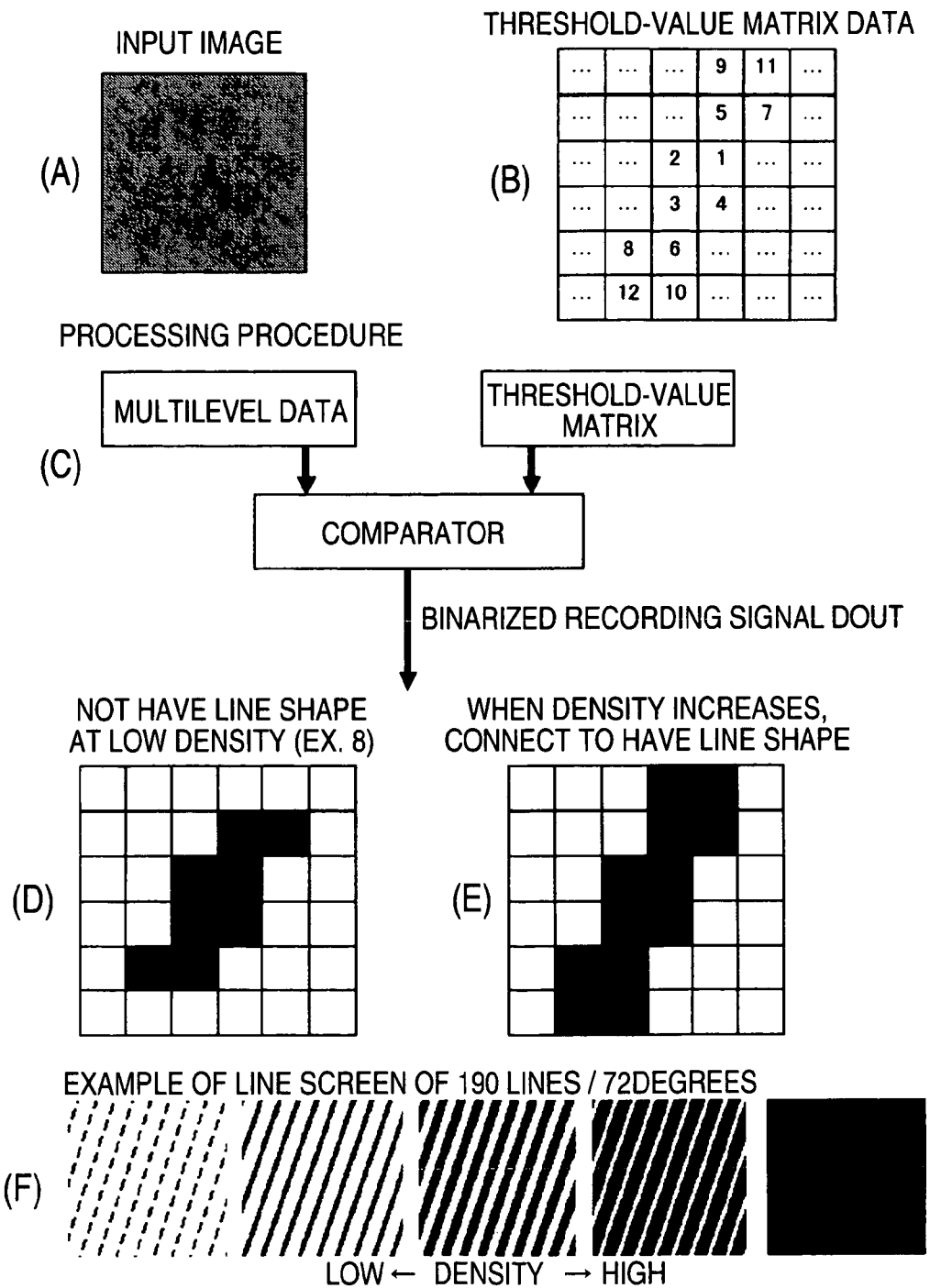
FIG. 13 is diagram illustrating a line-shaped halftone dot (line screen).
Figure 14:
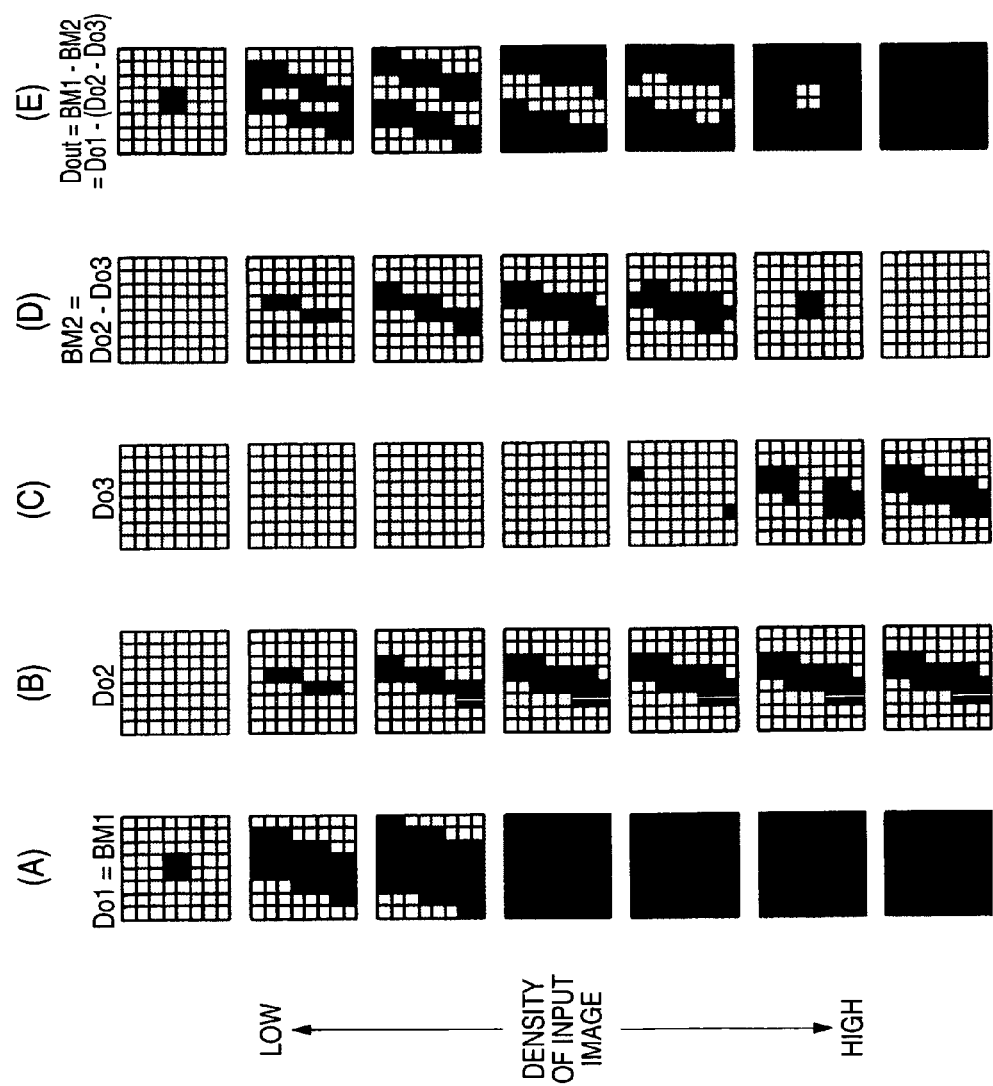
FIG. 14 is a diagram illustrating a process of generating a non-output dot (gap) with respect to the line-shaped halftone dot.

FIGS. 13 and 14 are diagrams showing binarization processing of a third embodiment (specifically, a halftone-dot processing). The binarization processing of the third embodiment has a feature in that what has a line-shaped halftone dot (line screen) as its original halftone-dot structure is taken as a process target, and the binarized processing section 20 generates non-output dots in accordance with a predetermined rule.

Here, FIG. 13 is diagram illustrating a line-shaped halftone dot (line screen), and FIG. 14 is a diagram illustrating a process of generating a non-output dot (gap) with respect to the line-shaped halftone dot. FIGS. 14(A) to (E) correspond to FIGS. 6(A) to 6(E), respectively.

In the process of generating the line-shaped halftone dot, a comparator compares input multilevel data, which is the process target (see FIG. 13(A)) and a threshold-value matrix for the line-shaped halftone dot (see FIG. 13(B)) as shown in FIG. 13(C), to thereby generate binarized recording signal Dout. In this case, as shown in FIG. 13(D), although a shape of the halftone dot does not have a line shape (line shape) at a low density (for example: 8), the dots are grown in a single direction as shown in FIG. 13(E) as density increases to thereby connect in the line shape.

That is, as shown in an example of a line screen of 190 lines/72 degrees, in the line-shaped screen processing, an isolated dot is generated in a low-density region, dots are grown therefrom in a single direction, and dots, which are adjacent at low density, are connected to form the line shape.

Here, as shown in FIG. 14, as in the first embodiment where the dot-shaped halftone dot is dealt with, when an intensity of an image signal exceeds a predetermined value and is in a predetermined range, the binarized processing section 20 can thin out a signal inside a halftone dot (in this case, meaning inside of the line) by a synthesizing processing of binary data, which makes a part of dots inside the contour dots to be actual non-output dot while maintaining the contour dots, which are output dots contributing to formation of the contour of such a line-shaped halftone dot, that is, maintaining the line shape in accordance with the flowchart shown in FIG. 5, which is a processing procedure.

By applying the invention of this application to the line-shaped halftone dot (line screen), the same effect as the first embodiment can be enjoyed while an advantage of the line-shaped halftone dot such as the fact that the line-shaped halftone dot is strong against disturbance at the time of image formation and color moire can be enjoyed, and a layer thickness of coloring material inside the halftone dot can be thinned without a contour shape of the halftone dot made of toner or ink being deformed. The coloring material of the halftone-dot portion can be thinned effectively without deterioration of the image quality, and a consumption amount of the coloring material can be reduced.

<Output Example 1 of Halftone Dot of Third Embodiment>

FIG. 15 is a first example of generating gap with respect to the line-shaped halftone dot according to a halftone-dot process procedure of the third embodiment. This first example shows the case where the third embodiment is applied to the line screen of 190 lines/72 degrees. FIG. 15(A) shows multilevel image data DMV, FIG. 15(B) shows a first example of binarized image data of a line screen structure and FIG. 15(C) shows a first example of gap generation with respect to the line screen. Respective diagrams show 12.5%, 25%, 50%, 75% and 100 in density.

If parameters of FIGS. 14(B), (C) and (D) take certain parameters and multilevel image data DMV takes lower density (in this case, 12.5% to 15%), gap exists in the line structure. However, if the multilevel image data DMV takes further higher density and is in a predetermined density range (in this example, 50% to 75%), non-output dots (gap) can be continued in a line shape in the line-shaped halftone dot, that is, the gap is grown in the line-shaped structure to form a double line structure (particularly, refers to as "perfect hollow double line structure).

However, in this case, since the gap becomes narrow on the high-density side (noticeable at 75%), if number of screen lines are a certain value and image is output with toner, the gap is filled with the toner and a problem of the gradation reproducibility arises. That is, in the case where the line-shaped gap is provided in the line structure, as the number of screen lines increases, if the perfect hollow double line structure is employed, the line structure become too narrow and reproducibility of the making process may be deteriorated.

<Output Example 2 of Halftone Dot of Third Embodiment>

FIG. 16 is a second example of generating gap with respect to the line-shaped halftone dot according to a halftone-dot process procedure of the third embodiment. This second example shows the case where the third embodiment is applied to the line screen of 190 lines/72 degrees as well. FIGS. 16(A) to (C) correspond to FIGS. 15(A) to (C), respectively.

By changing parameters of the FIGS. 14(B), (C) and (D), the third embodiment can be applied as shown in the image example of the second example, unlike the image example of the first example. In this second example, if the multilevel image data DMV takes lower density (in this case, 12.5% to 15%), gap exists in the line structure. However, if the multilevel image data DMV takes further higher density and is in a predetermined density range (in this example, 50% to 75%), it is maintained that the non-output dots are in an isolated state. That is, it is possible that the non-output dots are not continued in the line-shaped halftone dot.

In this case, unlike the first example, the non-output dots (gap) having a size to some extent can be generated surely even on the high-density side. Therefore, even in the case where the number of screen lines becomes large, the phenomenon that the gap becomes narrow on the high-density side can be prevented by maintaining the non-output dots to be in the isolated state in the line-shaped halftone dot so that the gap is not continued in a line shape in the line-shaped halftone dot. As a result, even in the case where the image is actually output with toner, the phenomenon that the gap is filled with the toner can be prevented and the reproducibility of the line structure is enhanced. Therefore, the reproducibility of the gradation can be kept good.

Having described the invention by way of exemplary embodiments, it should be understood that the technical scope of the invention is not limited thereto, but various changes and modifications thereof can be made without departing from the spirit of the invention. Also, it should be understood that the invention covers such a modification or improvement.

Further, the embodiments are not intended to limit the invention recited in claims. Furthermore, all combinations of features described in the embodiments are not essential to the solving means of the invention. The embodiments include various inventions at various stages. Thus, various inventions may be made by appropriate combining a plurality of described elements. In addition, even if a few elements are removed from the overall elements of the embodiments, a configuration from which the removed few elements are excluded may be established as the invention as long as an effect of the invention can be obtained.

For example, in the first and second embodiments, when the image representing the gaps shown in FIG. 6(D) is generated, the second threshold-value matrix MTX 2 defining the gap size on the low density side and the third threshold-value matrix MTX 3 defining the gap size on the high density side are prepared and then the gap size in the entire middle density region of the multilevel image data DMV is specified by a combination of the both threshold-value matrixes. However, gap threshold-value matrixes (for example, putting two threshold values on the low and high density sides into one coordinate) giving the halftone dot pattern shown in FIG. 6(D) defining the gap size in the entire middle density region of the multilevel image data DMV may be stored in advance in the gap-profile storage section 29b. The binarization process may be performed in the first binary calculating process section 26 by using the gap threshold-value matrixes. With such configuration, it is possible to reduce the number of threshold-value matrixes to be used.

In addition, in the first embodiment, the gaps are formed inside the halftone dots by generating two images, i.e., the normal halftone-dot image shown in FIG. 6(A) and the halftone-dot image representing the gaps shown in FIG. 6(D), and then performing the logic synthesis for the two images. However, the binarization process may be performed after the threshold values or density of the input image is converted beforehand to form the halftone-dot image having the gaps shown in FIG. 6(E).

With such configuration, it is possible to omit the plurality of binarization processing sections for generating a basic halftone-dot image (an example of the binary image) and halftone-dot images (an example of the binary image; corresponding to FIG. 6(D)) corresponding to the gap image (an example of the binary image) for forming the gaps inside the halftone dots. Accordingly, it is possible to efficiently generate the halftone-dot images having the gaps.

<Configuration Using Computer>

Further, the above-described halftone dot process structure may be configured not only by a hardware processing circuit but also by software run by a computer on the basis of program codes for implementing a function.

Accordingly, it is possible to consider, as a part of the invention, a program or a computer-readable recording medium in which the program is stored to implement the image processing method, the image processing apparatus, or the image forming apparatus according to the invention, by means of software run by the computer. By employing a structure performed by the software, there is an advantage in that a process order and the like can be easily modified without modifying the hardware.

When the computer executes a series of halftone dot processes by using software, programs constituting the software are installed from a recording medium into a computer (for example, built-in microcomputer) built in a dedicated hardware, or a SOC (System On Chip) for implementing a desired system by mounting various functions such as a CPU (Central Processing Unit), logic circuits, memories and the like on a single chip, or a general-purpose personal computer which is capable of performing various functions by installing various programs into the computer, and the like.

The recording medium changes the state of energy, such as magnetism, light, electricity and the like, according to description contents of the program by using a reading unit included in a hardware resource of the computer, and delivers the description contents of the program to the reading unit according to a format of the signal corresponding to the change of the state of energy.

For example, the recording medium may include a magnetic disk (including a flexible disc (FD)) having a program recorded thereon, an optical disc (CD-ROM (Compact Disc-Read Only Memory)), a DVD (Digital Versatile Disc), an optical magnetic disc (including a MD (Mini Disc)), or a transportable package media composed of semiconductor memories and the like, all of which are distributed to users to provide a program separately from a computer, or a ROM or a hard disc having a program recorded thereon, which is provided to users in a condition in which it is installed beforehand in a computer. Also, the program constituting the software may be provided to users through a wired or wireless communication network.

For example, when a recording medium, which stores program codes of software for implementing the halftone processing function, is provided to a system or an apparatus and then a computer (or CPU or MPU) of the system or apparatus reads out and executes the program codes stored in the recording medium, it is possible to achieve the same effect as that obtained by a hardware processing circuit. In this case, the program codes themselves read out from the recording medium implements the halftone process functions.

Furthermore, not only the halftone process functions can be implemented when the computer executes the read program codes, but also, the halftone process functions can be implemented when OS (Operating System) running on the computer performs some or all of the actual processes on the basis of instructions of the program codes.

In addition, after the program codes read from the recording medium are written onto a memory installed in a function extension card inserted into a computer or a function extension unit connected to a computer, the halftone process functions can be implemented when a CPU or the like installed in the function extension card or the function extension unit performs some or all of the actual processes on the basis of instructions of the program codes.

Moreover, the program may be provided as a file in which the program codes for implementing the halftone process functions are described. In this case, the program may be provided as individual program modules according to the hardware configuration of a system constituted by the computer without being limiting to being provided as a collective program file.

What is claimed is:

1. An image processing method for generating a halftone-dot image, the image processing method comprising:

receiving an input image signal;

generating first binarized data D01 representing a halftone-dot that is represented by a plurality of dots and corresponds to an intensity of the input image signal;

generating second binarized data D02 representing a plurality of dots in response to the intensity of the image signal when the intensity of the image signal is in a first predetermined range, the generating second binarized data including selecting profile data according to at least one of a gap-size fixed system and a gap-size variable system, generating third binarized data D03 when the intensity of the image is in a second predetermined range;

generating a binarized recording signal Dout, wherein Dout=D01−(D02−D03);

changing a part of dots that are inside contour dots of the halftone dot that is represented by the first binarized data to non-output dots based on the second binarized data, wherein the contour dots of the halftone-dot represented by the first binarized data are output dots that contribute to forming of a contour of the halftone-dot to obtain halftone-dot data;

outputting the halftone-dot data; and when the intensity of the image signal is not within the first predetermined range, outputting the generated first binarized data.

2. An image processing apparatus, comprising:

a first halftone-dot image generating section that generates first binarized data D01 representing a halftone dot that is represented by a plurality of dots and corresponds to an intensity of an input image signal;

a second halftone-dot image generating section that generates second binarized data D02 representing a plurality of dots in response to the intensity of the image signal when the intensity of the image signal is within a first predetermined range, wherein in generating the second binarized data, the second halftone-dot image generating section selects profile data according to at least one of a gap-size fixed system and a gap-size variable system;

a third halftone-dot image generating section that generates third binarized data D03 when the intensity of the image is within a second predetermined range, a first calculation processing section that, when the intensity of the image signal is within the first predetermined range, changes a part of dots inside contour dots of the halftone-dot represented by the first binarized data to non-output dots based on the second binarized data, wherein the contour dots of the halftone dot are output dots that contribute to forming of a contour of the halftone dot; and a second calculation processing section that generates a binarized recording signal Dout, wherein Dout=D01−(D02−D03).

3. The image processing apparatus according to claim 2, wherein the second halftone-dot image generating section makes a number of the plurality of dots represented by the second binarized data dynamically correspond to the intensity of the image signal by making the number of the plurality of dots represented by the second binarized data gradually decrease from a maximum value before and after an intensity of a transition point at which the number of the plurality of dots represented by the second binarized data becomes maximum.

4. The image processing apparatus according to claim 3, wherein when the intensity of the input image signal is transitioned from a low intensity side, the second halftone-dot image generating section makes the intensity of a transition point be a value at which all pixels of the first binarized data becomes the output dots.

5. The image processing apparatus according to claim 2, wherein when the intensity of the image signal exceeds a first predetermined value on a low intensity side, the second halftone-dot image generating section generates the second binarized data representing a predetermined number of the non-output dots.

6. The image processing apparatus according to claim 5, wherein when the intensity of the image signal is within a range of the first predetermined value on the low intensity side and a second predetermined value on a high intensity side, the second halftone-dot image generating section generates the second binarized data representing the predetermined number of the non-output dots.

7. The image processing apparatus according to claim 2, wherein the second halftone-dot image generating section generates the second binarized data representing a cluster of the plurality of dots.

8. The image processing apparatus according to claim 2, wherein the halftone dot represented by the first binarized data is a dot-shaped halftone dot.

* * * * *